(12) United States Patent
Grieve et al.

(10) Patent No.: US 10,001,908 B2
(45) Date of Patent: *Jun. 19, 2018

(54) FLOW STATE TOTALS AND AUTO FLOW WAREHOUSING

(71) Applicant: Oracle International Corporation, Redwood Shores, CA (US)

(72) Inventors: Richard Stephen Grieve, Bristol (GB); Martin Hogg, Nailsea (GB); Simon Leaver Lord, Bristol (GB); Conor O'Neill, Bristol (GB); James Steadman, Bath (GB); Adam Chesney, Bristol (GB); Suman Karmakar, Foster City, CA (US); Stephen Vangasse, Congresbury (GB)

(73) Assignee: Oracle International Corporation, Redwood Shores, CA (US)

( * ) Notice: Subject to any disclaimer, the term of this patent is extended or adjusted under 35 U.S.C. 154(b) by 567 days.

This patent is subject to a terminal disclaimer.

(21) Appl. No.: 14/174,835

(22) Filed: Feb. 6, 2014

(65) Prior Publication Data
US 2015/0066856 A1 Mar. 5, 2015

Related U.S. Application Data

(60) Provisional application No. 61/872,479, filed on Aug. 30, 2013, provisional application No. 61/872,485, (Continued)

(51) Int. Cl.
*G06F 3/0484* (2013.01)
*G06F 3/0486* (2013.01)
(Continued)

(52) U.S. Cl.
CPC .......... *G06F 3/0484* (2013.01); *G06F 3/0486* (2013.01); *G06F 3/04842* (2013.01);
(Continued)

(58) Field of Classification Search
CPC ...... G06Q 10/06; G06Q 10/00; G06Q 10/103; G06Q 10/0631; G06Q 10/0633;
(Continued)

(56) References Cited

U.S. PATENT DOCUMENTS 5,515,488 A 5/1996 Hoppe et al.
5,710,899 A 1/1998 Eick
(Continued)

OTHER PUBLICATIONS

U.S. Appl. No. 14/174,789, Notice of Allowance dated Aug. 12, 2016, 11 pages.
(Continued)

*Primary Examiner* — Robert W Beausoliel, Jr.
*Assistant Examiner* — Pedro J Santos
(74) *Attorney, Agent, or Firm* — Kilpatrick Townsend & Stockton LLP

(57) ABSTRACT

A computing device can automatically generate a flow diagram showing statuses that objects in a system can possess, and the possible transitions between these statuses. Using snapshots of database data, the device can determine how the statuses of these objects have changed over time. The device can analyze the data to suggest which database fields likely represent object status. The device can render the flow diagram to illustrate system states at different selected times. Each rendered flow diagram can indicate, for the selected time point, the quantity of objects that possessed each status at that time, and, for a selected time interval, the quantity of objects that changed from each status to each other status during that time interval. The statuses can be represented in the flow diagram as status bubbles having sizes that are based on the quantities of objects having those bubble's statuses at the selected time point.

20 Claims, 25 Drawing Sheets

Related U.S. Application Data filed on Aug. 30, 2013, provisional application No. 61/872,490, filed on Aug. 30, 2013, provisional application No. 61/872,501, filed on Aug. 30, 2013.

(51) Int. Cl.
  *G06F 17/30* (2006.01)
  *G06Q 10/06* (2012.01)
  *G06T 11/20* (2006.01)

(52) U.S. Cl.
  CPC .... *G06F 17/3053* (2013.01); *G06F 17/30315* (2013.01); *G06F 17/30498* (2013.01); *G06Q 10/06313* (2013.01); *G06T 11/206* (2013.01)

(58) Field of Classification Search
  CPC ...... G06Q 10/063114; G06Q 10/06313; G06F 3/0481; G06F 3/0484; G06F 3/04842; G06F 3/0486; G06F 17/30315; G06F 17/30498; G06F 17/3053
  USPC .......................................................... 707/639
  See application file for complete search history.

(56) References Cited

U.S. PATENT DOCUMENTS

| | | | | |
|---|---|---|---|---|
| 6,041,306 | A * | 3/2000 | Du | G06F 9/4843 705/7.26 |
| 6,289,299 | B1 | 9/2001 | Daniel, Jr. et al. | |
| 8,285,835 | B1 * | 10/2012 | Deolasee | G06F 11/324 709/224 |
| 8,413,155 | B2 * | 4/2013 | Jackson | G06F 9/505 718/104 |
| 8,665,275 | B1 * | 3/2014 | Patrick | 345/440 |
| 8,701,078 | B1 * | 4/2014 | Holler | G06F 8/35 715/273 |
| 9,454,293 | B2 | 9/2016 | Grieve et al. | |
| 9,594,478 | B2 | 3/2017 | Grieve et al. | |
| 2004/0162741 | A1 | 8/2004 | Flaxer et al. | |
| 2007/0168060 | A1 | 7/2007 | Nixon et al. | |
| 2007/0192153 | A1 | 8/2007 | Toyofuku et al. | |
| 2008/0109785 | A1 | 5/2008 | Bailey | |
| 2008/0243902 | A1 | 10/2008 | Rong et al. | |
| 2009/0172687 | A1 * | 7/2009 | Bobak | G06Q 10/06 718/104 |
| 2010/0070448 | A1 | 3/2010 | Omoigui | |
| 2011/0055722 | A1 | 3/2011 | Ludwig | |
| 2011/0231489 | A1 | 9/2011 | Rathod | |
| 2012/0030634 | A1 | 2/2012 | Miyazaki | |
| 2012/0191704 | A1 | 7/2012 | Jones | |
| 2012/0254291 | A1 * | 10/2012 | Feldman | G06Q 10/06 709/203 |
| 2012/0271831 | A1 | 10/2012 | Narayanan et al. | |
| 2013/0111388 | A1 | 5/2013 | Togami | |
| 2013/0124538 | A1 | 5/2013 | Lee et al. | |
| 2014/0006984 | A1 | 1/2014 | Freedman et al. | |
| 2014/0019187 | A1 | 1/2014 | Olsen et al. | |
| 2014/0236843 | A1 | 8/2014 | Bain et al. | |
| 2014/0289653 | A1 | 9/2014 | Chen et al. | |
| 2015/0066898 | A1 | 3/2015 | Grieve et al. | |
| 2015/0066961 | A1 | 3/2015 | Grieve et al. | |
| 2015/0067553 | A1 | 3/2015 | Grieve et al. | |
| 2015/0310100 | A1 | 10/2015 | Bursey et al. | |

OTHER PUBLICATIONS

U.S. Appl. No. 14/174,786, Non Final Office Action dated Aug. 15, 2016, 18 pages.

U.S. Appl. No. 14/174,805, Notice of Allowance dated May 31, 2016, 12 pages.

U.S. Appl. No. 14/174,786, "Final Office Action", dated Sep. 20, 2017, 8 pages.

U.S. Appl. No. 14/174,789, "Supplemental Notice of Allowance", dated Feb. 14, 2017, 2 pages.

* cited by examiner

FLOW STATE TOTALS AND AUTO FLOW WAREHOUSING

CLAIM OF PRIORITY

The present application claims priority under 35 U.S.C. § 119(e) to the following patent applications, the contents of each of which are incorporated by reference herein: Provisional U.S. Patent Application Ser. No. 61/872,479, filed Aug. 30, 2013, and titled "FLOW FIELDS"; Provisional U.S. Patent Application Ser. No. 61/872,485, filed Aug. 30, 2013, and titled "FLOW STATE TOTALS AND AUTO FLOW WAREHOUSING"; Provisional U.S. Patent Application Ser. No. 61/872,490, filed Aug. 30, 2013, and titled "FLOW PIPE TOTALS"; and Provisional U.S. Patent Application Ser. No. 61/872,501, filed Aug. 30, 2013, and titled "AUTO DRAW FLOW".

FIELD OF THE INVENTION

Embodiments of the invention generally pertain to the field of databases, and more specifically to techniques for generating, based on data obtained from a database, a visual flow that illustrates the manner in which the statuses of objects in a system change over time.

BACKGROUND OF THE INVENTION

People within a business organization often store their data in a relational database. Data stored in a relational database can be organized into multiple tables having different table names. Each such table can include multiple columns and rows. The columns typically represent some attribute of the data. The rows typically represent entities that possess those attributes. The intersections of the columns and tables are cells that contain values. In a particular row representing a particular entity and in a particular column representing a particular attribute, a particular cell may contain a value of that particular attribute for that particular entity. For example, a column of a table can indicate different statuses of bugs detected during a software development cycle. In the context of software bugs, these statuses might include "open," "awaiting verification," "fixed," etc. Other columns might represent other attributes, such as a comment or a description pertaining to the bugs, or an identity of a software tester who discovered the bug. Different rows of a table can represent records for different bugs discovered during software testing. The cells in a particular row can contain the values of the attributes for a particular bug. Assuming that a particular column represents a status, the cells in those columns might contain numbers that represent the various statuses that a bug can have.

People within a business organization may be interested in knowing how objects tend to flow through different statuses that those objects can possess during their lifetimes. For example, software developers and testers may be interested in knowing how discovered bugs tend to flow from "open" to "awaiting verification" to "fixed" status. Software developers and testers may be interested in knowing, at any given moment in history, and for each status, how many bugs possessed that status. Such information can help these people to address possible inefficiencies in the software development and testing process. People may be interested in knowing about status flows for a variety of different objects. For example, in the context of a product order system, people may be interested in knowing the flow of product orders through statuses such as "shipped," "in transit," "lost," "arrived," "complete," etc. Different kinds of objects can have different kinds of statuses at different times. Different kinds of objects therefore can follow different status flows.

BRIEF SUMMARY OF THE INVENTION

Described herein is a technique for recommending statuses for inclusion within a workflow. A separate score can be generated for each data set of a plurality of data sets, such as a plurality of columns within a plurality of relational tables within a database. The data sets of the plurality of data sets can be ranked based on the scores generated for the data sets. The ranked data sets can be displayed. User input selecting a subset of the ranked data sets can be received. The workflow can be generated based at least in part on the data sets contained in the subset. For each data set contained in the subset, a separate status bubble, which corresponds to a status that an object can possess, can be added to the workflow.

Generating the score for each data set can involve generating a data type score based at least in part on a type of data that is stored in the data set and a maximum length of data that can be stored in the data set. Generating the score for each data set can involve generating a distinct value score based at least in part on a quantity of distinct values that are stored in the data set and a total quantity of values that are stored in the data set. Generating the score for each data set can involve generating a query usage score based at least in part on a quantity of historical queries having a SELECT list that includes the data set, a quantity of historical queries having a WHERE clause that includes the data set, a quantity of historical queries having a GROUPBY clause that includes the data set, and a quantity of historical queries having an ORDERBY clause that includes the data set. Generating the score for each data set can involve generating a name score based at least in part on whether a name of the data set contains one or more words from a specified set of words.

Described herein is a technique for interactively displaying statuses in a workflow. A set of statuses in the workflow can be identified from a database. For each particular status of the statuses, a first quantity of objects possessing the particular status at a first point in time can be determined from the database. A graphical element for each particular status of the statuses can be rendered. Each graphical element can contain an indication of the first quantity of objects for that particular status. User input can be received. In response to the receipt of the user input, for each particular status of the statuses, a second quantity of items possessing the particular status at a second point in time can be determined from the database. The graphical element for each particular status of the statuses can be adjusted to cause each graphical element to indicate the second quantity of objects possessing the particular status. Within the rendered workflow, the size of each graphical element can depend on a quantity of objects possessing a status corresponding to that graphical element. Additional statuses can be added to the workflow. Snapshots of the database can be automatically generated for each of several points in time. The snapshots can be automatically stored within a data warehouse that is separate from the database.

Described herein is a technique for displaying flows within a workflow. A set of statuses of the workflow can be determined from a database. A first quantity of objects possessing each of the statuses at a first point in time can be determined from the database. A second quantity of objects possessing each of the statuses at a second point in time can be determined from the database. A difference between the first and second quantities can be calculated for each of the statuses. A probable quantity of objects that flow between two statuses can be estimated based on the difference. A graphical element that indicates the probable quantity of objects that flow between the two statuses can be rendered. The graphical element can be a directional pipe that indicates flow of object status from a source status to a destination status over time.

Described herein is a technique for automatically rendering a flow diagram. User input that specifies a key status can be received. A network of relationships between the key status and one or more other statuses can be generated. Flows for connections between the statuses in the network can be determined based on quantities of objects that flowed between the statuses in the network during a specified time period. The connections can be ranked based on flows determined for the connections. A subset of the ranked connections can be selected. A critical path can be determined based on the subset of the ranked connections. A flow diagram including the critical path can be rendered. User input that requests increase in zoom can be received. The flow diagram can be re-rendered at a different zoom level than a zoom level at which the flow diagram had been rendered in response to the receipt of the user input.

The network of relationships can be generated in the following manner. User input specifying the time period can be received. Data pertaining to points in time during the specified time period can be gathered from snapshots. For each particular status in a set of selected statuses that initially includes only the key status, both a first set of other statuses objects possessed prior to assuming the particular status and a second set of other statuses objects assumed after possessing the particular status can be determined based on the snapshots. A determination can be made whether a current zoom level is equal to a target zoom level. The current zoom level can be incremented in response to determining that the current zoom level is not equal to the target zoom level. At least some of the first and second sets of statuses can be included in a revised set of selected statuses. The first and second sets can be re-determined based on the revised set of selected statuses.

DETAILED DESCRIPTION OF THE INVENTION

Figure 1:
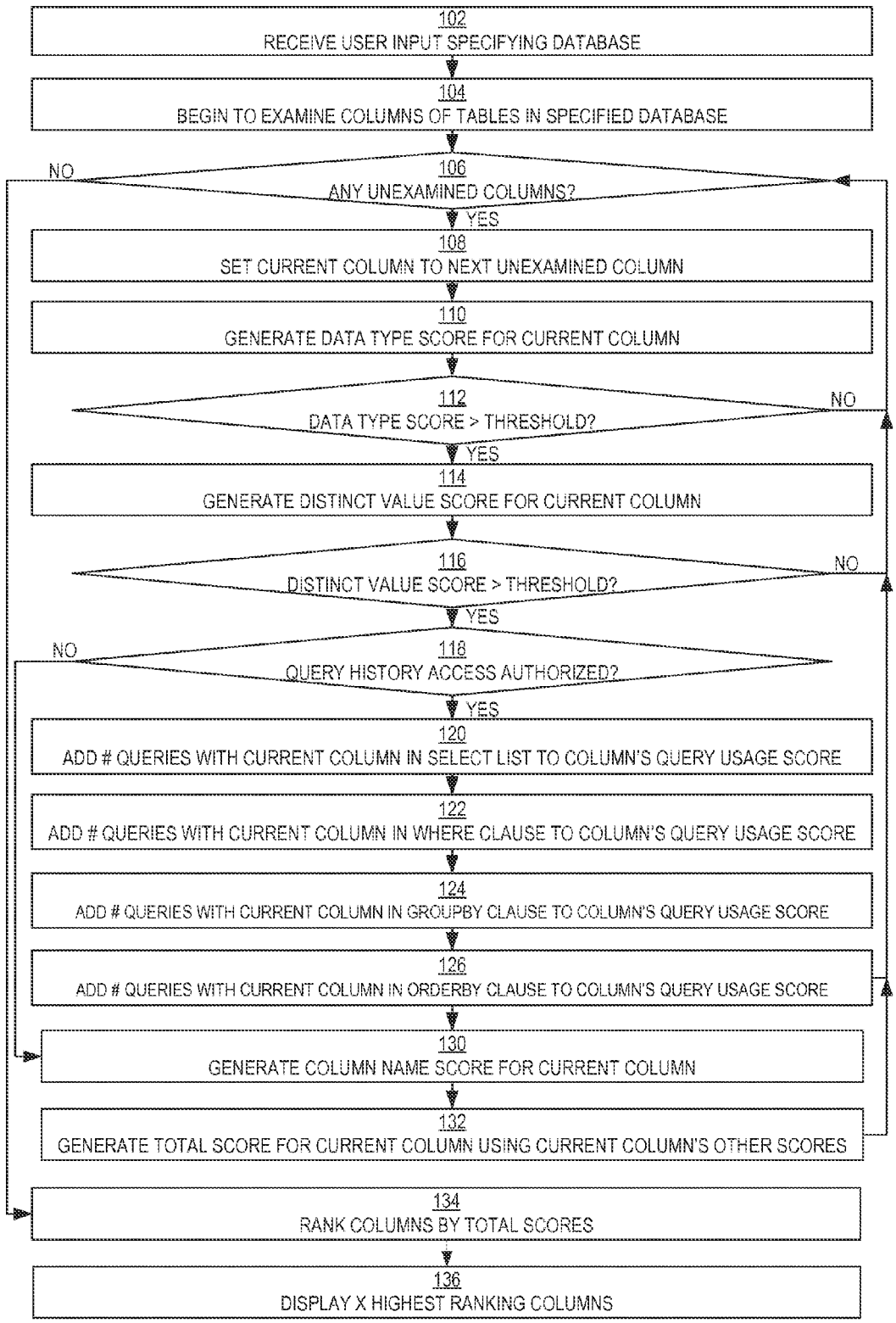
FIG. 1 is a flow diagram that illustrates a technique for automatically determining a set of candidate statuses for a status flow based on data stored in relational tables, according to an embodiment of the invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

Systems depicted in some of the figures may be provided in various configurations. In some embodiments, the systems may be configured as a distributed system where one or more components of the system are distributed across one or more networks in a cloud computing system.

In one embodiment of the invention, a computing device can generate and display a visual representation of a status flow of the kind discussed above. Under one approach, the generation of the status flow to be displayed can be accomplished largely through a user's interaction with the device. For example, according to one approach, a user can instruct the device what the various statuses in a flow are to be. Each of these statuses can be represented as a circle or bubble in the flow, for example. By dragging his finger across the device's touchscreen display, the user can cause the device to place each status bubble in a desired location on the display. The user can direct the device to add a specified title to each status that the device can then display within that status' bubble. The user can then interact with the device to indicate how object flow between these status bubbles. For example, under one approach, a user can drag his finger across a touchscreen from one bubble to another in order to instruct the device to draw an arrow-like directional "pipe" from the first bubble to the second bubble, thereby illustrating the flow of objects from the first status to the second status. Such an approach for generating a visual depiction of a flow can be appropriate under circumstances where the user is already largely familiar with the system to which the flow applies. If the user already has a firm notion of the various statuses that objects in the system can possess and the way that those objects' statuses change within the system, then the largely manual but device-assisted approach discussed above can be appropriate.

Flow Fields

Under some circumstances, a user desiring to generate a status flow might not be very familiar with the system for which that status flow is to be generated. Such a user might not be familiar with all of the possible statuses than an object might possess at any given time. Such a user might not be familiar with the set of other statuses that an object possessing a particular status can assume directly after possessing that particular status. Without such familiarity, the user might find it difficult to instruct the device what the flow's status bubbles are to be and where they are to be located relative to each other within the flow. The user might find it difficult to determine how the directional pipes linking these bubbles are to be placed within the flow.

Therefore, according to an embodiment of the invention, a device-assisted technique can automatically determine status candidates for which there are potentially to be status bubbles in the flow. The device can perform this technique automatically based on data stored in a relational database, for example, although embodiments of the invention are not limited to databases. In alternative embodiments of the invention, the device can similarly perform the technique based on unstructured data. Following one embodiment of the technique, the device can automatically examine the columns within the database's relational tables in order to determine a set of status candidates to present to the user. These status candidates correspond to the columns that the device determines are most likely to indicate statuses for objects whose data are stored in the tables. The user can then select, from the set of status candidates, a subset of statuses that are to be represented as status bubbles within the flow. The columns that the device determines are most likely to indicate statuses are called "flow fields." Although the user might not be able to tell from the relational data alone which columns are likely to indicate object status, by following the technique, the computing device can automatically attempt to choose columns that probably do indicate object status.

FIG. 1 is a flow diagram that illustrates a technique for automatically determining a set of candidate statuses for a status flow based on data stored in relational tables, according to an embodiment of the invention. In block 102, a computing device, such as a tablet having a touchscreen display, receives, from a user, user input that specifies a database, for example, although embodiments of the invention are not limited to databases. In alternative embodiments of the invention, the device can similarly receive user input that specifies unstructured data. In block 104, the device begins to examine each column of each table in the specified database (or other data source). In block 106, the device determines whether there are any columns in the specified database (or other data source) that the device has not yet examined. If so, then control passes to block 108. Otherwise, control passes to block 134.

In block 108, the device sets the current column to be the next column that the device has not yet examined. In block 110, the device generates a data type score for the current column based on the data type of the current column (e.g., number, varchar, etc.) and the maximum length of the data that can be stored in the current column. In one embodiment, the data type score for columns potentially representing object status can range from 0 to 100. In one embodiment, certain data types, such as Boolean, binary, BLOB (binary large object) and non-whole numbers, produce a data type score of −1 for the current column, since these data types are highly unlikely to represent object status. In one embodiment, different data types are associated with different numerical weights, and a column having a particular data type receives a data type score based on the weight associated with that column's data type. Data types such as integer and string can be associated with relatively high weights relative to other data types, since these data types are highly likely to represent object status. In one embodiment, the data type score of a column having a string data type increases as the maximum length of the data that can be stored in the column decreases below a specified number of characters (e.g., 100 characters), since shorter strings are more likely to represent object status than longer strings are.

In block 112, the device determines whether the current column's data type score exceeds a specified threshold value (e.g., 0). If so, then control passes to block 114. Otherwise, control passes back to block 106—under these circumstances, the current column is excluded from consideration as a candidate flow field.

In block 114, the device generates a distinct value score for the current column based on how distinct the values in the current column are. Generally, columns that contain relatively few distinct values that are frequently repeated are more likely to represent object status than are columns that contain relatively many distinct values that are infrequently repeated. In one embodiment, the device generates the current column's distinct value score using the formula $(x/y)*100$, where x represents the quantity of distinct values occurring in the current column, and y represents the quantity of rows or records in the table in which the current column exists. Thus, the distinct value score can represent a percentage value.

In block 116, the device determines whether the current column's distinct value score is no greater than a specified threshold value (e.g., 10%). If so, then control passes to block 118. Otherwise, control passes back to block 106—under these circumstances, the current column is excluded from consideration as a candidate flow field.

In block 118, the device determines whether the user is authorized to access a query history of the specified database (or other data source). If so, then control passes to block 120. Otherwise, control passes to block 130—under these circumstances, the query usage score will not be considered as a factor in determining whether the current column should be considered as a candidate flow field.

In block 120, the device adds, to a query usage score for the current column, a quantity of historical queries having a SELECT list that includes the current column. In block 122, the device adds, to the query usage score for the current column, a quantity of historical queries having a WHERE clause that includes the current column. In block 124, the device adds, to the query usage score for the current column, a quantity of historical queries having a GROUPBY clause that includes the current column. In block 126, the device adds, to the query usage score for the current column, a quantity of historical queries having an ORDERBY clause that includes the current column.

In block 130, the device generates a column name score for the current column based on whether the current column's name contains a word within a specified set of words. For example, the specified set of words might include status-suggesting words such as "state," "status," "code," etc. In one embodiment, columns containing at least one words within the specified set receive a relatively high column name score, while columns not containing any words within the specified set receive a relative low column name score.

In block 132, the device generates a total score for the current column based on the data type score, distinct value score, query usage score (if it was generated for the current column), and column name score for the current column. In one embodiment, different ones of these scores can be weighted differently and have different amounts of influence on the computation of the current column's total score. Control passes back to block 106.

Alternatively, in block 134, the device ranks the columns in the specified database (or other data source) according to their total scores determined in block 132. In block 136, the device displays at least a subset of the highest-ranking columns to the user. In one embodiment, the subset includes only the top X ranked columns, where X is some specified number or some specified percentage of the quantity of columns in the specified database (or other data source). In one embodiment, the device can display all of the specified database's columns to the user, along with an indication for each column of whether or how likely it is (based on the column's total score or ranking) that the column represents object status. In one embodiment, the device can modify the column names for presentation to the user by formatting the column names to make the column names more human-readable. Such formatting can include the conversion of underline characters to space characters, for example. Thus, the device presents, to the user, a recommended set of candidate statuses for the flow that the user will generate. In one embodiment, the user can then select certain candidate statuses to be used as status bubbles within the flow.

Figure 2:
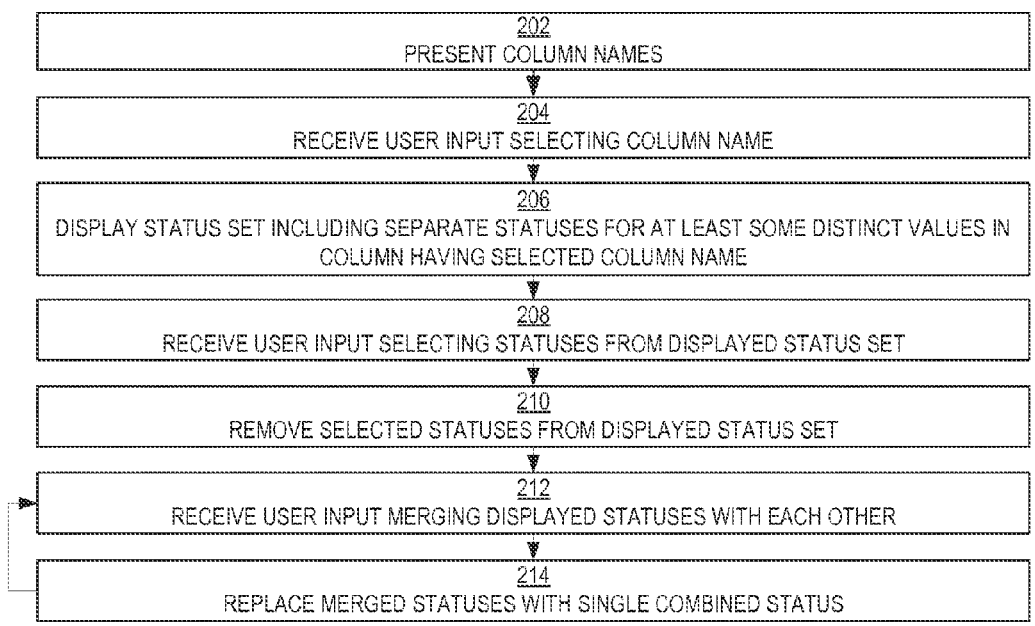
FIG. 2 is a flow diagram that illustrates a technique for refining a set of flow fields based on user-selected columns, according to an embodiment of the invention.

In one embodiment, following the device's presentation of the recommended set of candidate statuses to the user, the device can receive further input from the user to refine the set of flow fields that will be used in the flow. FIG. 2 is a flow diagram that illustrates a technique for refining a set of flow fields based on user-selected columns, according to an embodiment of the invention. In block 202, the device presents a set of column names to the user. For example, the device can present the set of names of recommended columns as discussed above in block 136 of FIG. 1. In block 204, the device receives, from the user, user input that selects a column name from the set of column names. In block 206, the device displays a status set that includes separate statuses for at least some distinct values contained in the particular column having the selected column name. In one embodiment, the status set can include a separate status for each such distinct value. Each such status can include a status name, which initially may be the distinct value itself, and also a count of the quantity of rows that contain that distinct value in the particular column. In one embodiment, the user can instruct the device to modify the status name to a user-specified status name. In one embodiment, the device displays the statuses from the set in an order that is based on the quantity of rows that contain that distinct value in the particular column, such that statuses having the largest quantities of rows appear foremost in a displayed status list.

In block 208, the device receives, from the user, user input that selects one or more statuses from the displayed status set. In block 210, the device removes the selected statuses from the displayed status set.

In block 212, the device receives, from the user, user input that merges two or more statuses from the displayed status set with each other. For example, the user input can take the form of a touchscreen gesture that drags one status from the displayed status set into another status from the displayed status set, thereby indicating to the device that those status sets are to be merged into a single combined status. In block 214, the device replaces the two or more statuses with a single combined status. In one embodiment, the user can instruct the device to modify the status name of the resulting combined status to a user-specified status name. In one embodiment, the device adds the counts of the quantities of rows that contain the any of the merged statuses' distinct values in the particular column, and displays the sum as the count for the resulting combined status. The operations of blocks 212 and 214 can be repeated multiple times. The remaining statuses in the displayed set can be those that ultimately will be included as status bubbles in the flow. In one embodiment of the invention, the merging of statuses as discussed above is triggered by the user dragging, from one region of the user interface into a flow region of the user interface in which an existing flow is being generated, a candidate status directly onto an existing status bubble with which the candidate status is to be merged.

Figure 3:
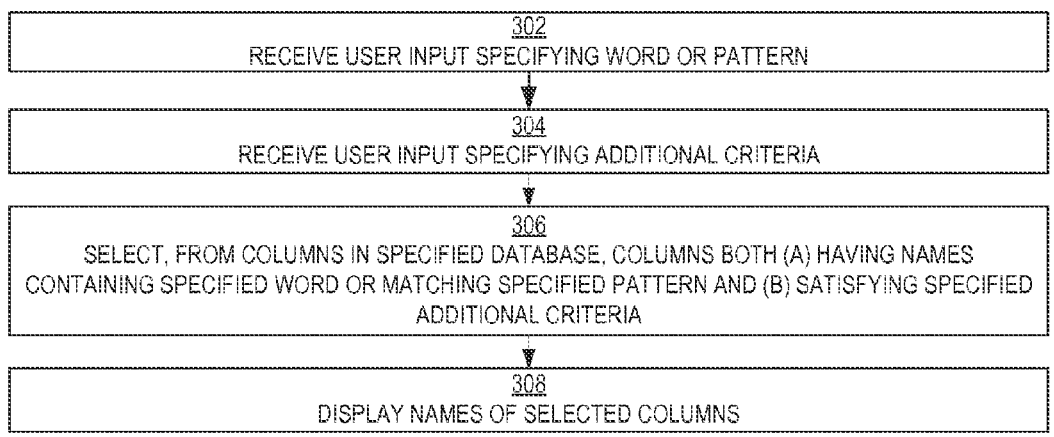
FIG. 3 is a flow diagram that illustrates a technique for receiving a user selection of flow fields from a set of columns filtered based on user-specified criteria, according to an embodiment of the invention.

Potentially, a user may have some familiarity with the data that is stored in the database (or other data source), and this familiarity can help the user to select some additional columns, or distinct values contained therein, as status bubbles in the flow. These selected columns, or selected distinct values within such columns, can be added to the set of statuses that already have been selected to be status bubbles in the flow using previously described techniques. FIG. 3 is a flow diagram that illustrates a technique for receiving a user selection of flow fields from a set of columns filtered based on user-specified criteria, according to an embodiment of the invention. In block 302, the device receives, from the user, user input specifying a word and/or pattern. The pattern can include normal characters and wildcard characters to be matched, for example. In block 304, the device receives, from the user, user input specifying additional criteria. For example, the additional criteria can specify that only columns that contain primary keys are to be returned. For another example, the additional criteria can specify that only columns that have a specified data type are to be returned. For another example, the additional criteria can specify that only columns that store data conforming to a specified minimum or specified maximum size are to be returned. For another example, the additional criteria can specify that only columns that contain values that are used as join keys in join operations involving multiple tables are to be returned.

In block 306, the device selects, from all of the columns in all of the tables in a specified database (e.g., the database specified in block 102 of FIG. 1), a subset of columns that both (a) have column names that contain the user-specified word or that match the user-specified pattern and (b) satisfy the additional user-specified criteria. As mentioned above, embodiments of the invention are not limited to databases. In alternative embodiments of the invention, the device can similarly perform the technique based on unstructured data. In block 308, the device displays names of the selected columns to the user. In one embodiment, in response to a user's instruction to do so, the device displays one or more values contained within user-selected columns from the selected columns. This information can assist the user in determining whether those columns actually do represent object status. The technique discussed above in connection with FIG. 2 can then be performed relative to the names of the selected columns in order to select certain distinct values (representative of statuses) to be included as additional status bubbles to be included in the flow.

In one embodiment of the inventions, the device also enables users to generate derived statuses that are not directly reflected by any single column in the database (or other data source). This feature beneficially eliminates the need for the database schema to be modified to include columns that would serve as a basis for such statuses. In an embodiment, the device includes an interface that receives user input that specifies one or more (e.g., two) columns and distinct values contained in those one or more columns. The user input can also specify a logical operator such as AND or OR. The user input can also specify equality and inequality operators. The device can then generate a new derived status that is associated with the columns, distinct values, logical operators (if any), and equality or inequality operators (if any). The device can provide a user interface through which such a derived status can be stored and used as a flow field or status bubble in a flow in a manner similar to other non-derived statuses discussed above. In an embodiment, for both derived and non-derived fields, the device can provide a user interface through which the name of a status automatically obtained from a column name or from a distinct value in a column can be modified to a user-specified name and persistently stored in association with the corresponding status bubble.

Thus, discussed above are techniques whereby a computing device can recommend candidate statuses to users for including in a flow. The techniques can make use of information contained in the database (or other data source) in order to attempt, automatically, to estimate which columns are likely to contain status data. A user can then select certain of the recommended candidate statuses and place corresponding status bubbles within the flow. In one embodiment, this is accomplished through a user interface that the user uses to drag a recommended candidate status from one region of the user interface to a flow region of the user interface, at which point the status bubble becomes a part of the flow. In one embodiment, the candidate statuses also include a generic "start" status that the user can initially drag into the flow region of the user interface to being creating the flow. As is discussed above, in one embodiment, a recommended candidate status can be merged with an existing status bubble in the flow in response to the recommended candidate status being dragged onto the existing status bubble.

While or after the user has placed status bubbles in the flow, the user can link these statuses together with arrow-like directional pipes. In an embodiment, this linkage is accomplished through dragging gesture against the device's touch-screen, from a source status bubble to a destination status bubble. In another embodiment, this linkage is accomplished automatically when the user drags a candidate status into the flow region of the user interface. In such an embodiment, the device can automatically link the new status bubble as a destination status bubble with a directional pipe originating from a source status bubble to which the new status bubble is closest in the flow region of the user interface. Once the directional pipe has been placed in either manner, the device can use historical database data (or historical data from some other data source) to generate data that indicates how objects have flowed, over time, from the source status to the destination status. This data can be generated through a series of temporally-spaced database snapshots spanning some specified historical period. In one embodiment, the device presents, next to each directional pipe, a graphic that represents this data. In one embodiment, the graphic can take the form of a two-dimensional bar chart or line graph, in which one axis represents discrete time intervals and the other axis represents the quantity of objects that changed status from the source status to the destination status during the corresponding time interval.

In one embodiment, each status bubble additionally contains a graphic such as a two-dimensional bar chart or line graph that represents how the status bubble's object count changes over time; one axis can represent time and the other axis can represent the quantity of objects having the bubble's status at that time.

Flow State Totals

In one embodiment, in addition to the flow diagram, including status bubbles and directional pipes linking those status bubbles as discussed above, the user interface can include a timeline that can be manipulated through user input. The timeline can be at virtually any scale, covering a span of minutes or a span of months or some other time frame. The user interface can receive user input that selects a specified point upon the timeline. In response to such a selection, the device can transition the display of the flow diagram to represent a state of the database (or other data source) at a moment in time corresponding to the selected point. At the selected moment in time, various objects represented in the database (or other data source) can possess various ones of the statuses reflected by the flow's status bubbles.

In an embodiment, the device's transition of the display involves the device's calculation, for each status bubble in the flow, of the quantity of objects in the database (or other data source) that possessed that status' bubbles corresponding status. In transitioning the display, the device can update, in each displayed status bubble in the flow, the displayed count of objects that possessed that bubble's status at the selected point in time. Furthermore, in one embodiment, the device can additionally re-size each status bubble in the flow proportionately to the object count contained within that status bubble; status bubbles having larger counts can be sized larger than status bubbles having smaller counts. As the device receives user instructions to transition the display of the flow to different points in time in the manner described above, the device can modify the object counts and sizes for each status bubble accordingly.

In one embodiment, the user interface additionally includes user-selectable controls for playing or pausing an animated slideshow of the states of the flow at progressing points in time. The device's receipt of a user input that selects the play control causes the device to animate the transition of the flow state display gradually but continuously from the selected point on the timeline toward the end thereof. Thus, a user can watch as certain status bubbles grow or shrink as objects flow between their corresponding statuses over time. In an embodiment, while viewing a particular state of the flow using this technique, a user can optionally add an annotation that refers to the particular state as a whole. The device can store this annotation in association with the time point corresponding to the flow state that was being viewed at the time that the annotation was made—the flow state to which the annotation refers. Later, when the same or other user view this particular flow state (e.g., using the timeline control), the device can present the annotation along with the particular flow state so that such users benefit from the knowledge contained therein.

According to an embodiment of the invention, the database (or other data source) periodically stores snapshots of at least some tables in the database. For example, the database can periodically store snapshots of each table that contains a column for which there is a corresponding status bubble in the flow. The database can generate a snapshot at the end of each time interval having a specified duration. The device can access these snapshots in order to generate and display the flow as it would have existed at a user-specified time.

Figure 4:
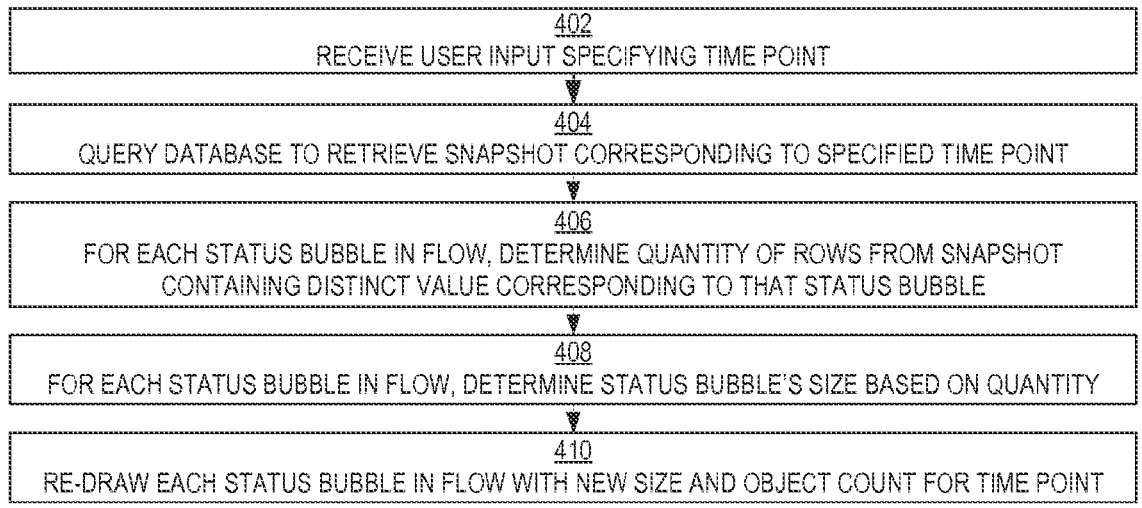
FIG. 4 is a flow diagram that illustrates a technique for generating and displaying a flow including status bubbles representing counts of objects having corresponding statuses at a user-specified time, according to an embodiment of the invention.

FIG. 4 is a flow diagram that illustrates a technique for generating and displaying a flow including status bubbles representing counts of objects having corresponding statuses at a user-specified time, according to an embodiment of the invention. In block 402, the device receives user input that specifies a point in time. For example, using a touchscreen interface of a tablet computing device, a user can select, on a timeline presented on a user interface along with the flow, a particular point in time. In response to the receipt of this user input, the device can reposition, on the timeline, a marker that indicates that the selected point in time is the current temporal position at which the state of the flow is to be shown.

In block 404, the device queries a database to retrieve a snapshot of at least a portion of the database that corresponds to the selected point in time, for example, although embodiments of the invention are not limited to databases. In alternative embodiments of the invention, the device can similarly perform the technique based on unstructured data. The device can query for the closest snapshot available, time-wise, if no snapshot exists for the exact time point selected. The database can be stored remotely from the device. The database (or other data source) can even be stored in a cloud computing environment. Under such circumstances, the database can take the form of a service that is not owned by the user, but may be accessed by multiple users over networks remotely. The query can be narrowed such that only status data (i.e., certain columns) pertaining to the status bubbles in the flow are selected by the query. Data pertaining to other snapshots are not queried.

In block 406, for each status bubble in the flow diagram, the device determines a quantity of rows from the query results that contain the distinct value that corresponds to that status bubble. Thus, the device can determine, for each status bubble, a quantity of objects that possessed that bubble's status at the selected time point. In block 408, for each status bubble in the flow diagram, the device determines a size for that status bubble. In one embodiment, each status bubble's radius is calculated by multiplying or dividing that status bubble's quantity of objects by some specified value. In block 410, for each status bubble, the device re-draws that status bubble with its new size and its new object count as of the selected time point.

The technique shown in FIG. 4 can be performed multiple times. The technique can be performed each time that the device receives user input specifying a different time point on the timeline. After displaying the flow with status bubbles containing object counts as of a first point in time, the device can receive user input specifying a second point in time. In response, the device can display the flow with status bubbles containing objects counts as of the second point in time. Thus, each status bubble in the flow can contain a count of the quantity of objects that possessed that bubble's status at a specified moment, and each status bubble's size can be scaled to be proportionate to the object count contained within that status bubble.

Auto Flow Warehousing

As is discussed above, in order to show representations of the flow at different points in time, a database (or other data source) can store snapshots of its state—or the state of specified portions thereof—at various time points. In one embodiment of the invention, the database itself does not maintain these snapshots. Instead, in an embodiment of the invention, the database periodically performs a back-up operation that generates the snapshot, and this snapshot is then moved from the database to an external data warehouse where the snapshot is persistently stored. In such an embodiment, when the device queries for a particular snapshot pertaining to a specified moment in time, the device can query the data stored in the data warehouse instead of the data stored in the database.

In one embodiment of the invention, in order to reduce the size of the data stored in the warehouse and the time required to generate and move the back-up data, a tool is provided whereby a user can specify which of the database's tables are to be involved in the back-up operation. For example, a user can choose, from all of the tables in the database, just the tables that include columns that contain object status data. As a result of this selection, the back-up operation will only create a copy of the data from the selected tables, and a smaller volume of data will be communicated to and stored at the data warehouse during each temporal interval. Alternatively, using a technique similar to that discussed above in connection with FIG. 1, a tool can attempt to determine automatically which of the database's columns are most likely to store object status. An automated software agent, potentially executing on the same system that contains the database, can then use this determination to periodically perform a back-up operation of just the tables that contain those columns.

Flow Pipe Totals

As is discussed above, in an embodiment of the invention, directional pipes can be added to a flow linking status bubbles and illustrating the direction in which objects flow in a system from one status to another. Each pipe can serve as an indication that one or more objects changed status from the status of the source status bubble to the status of the destination status bubble. There are numerous ways in which these directional pipes can be added to the flow. The directional pipes can be added in response to a user performing a dragging gesture across a touchscreen from a source status bubble to a destination status bubble. The directional pipes can be added automatically in response to a user dragging a recommended candidate status into a flow region of a user interface, connecting the new status bubble with a closest existing status bubble as a destination-source pair. Other techniques for automatically generating a flow are also discussed below.

Also as is discussed briefly above, in an embodiment of the invention, the device displays a graphic next to each directional pipe. The graphic illustrates a quantity of objects that flowed along the directional pipe from the source status bubble to the destination status bubble during each time interval in a series of multiple time intervals. The graphic can take the form of a two-dimensional bar chart or line graph in which one axis represents the time intervals and the other axis represents the quantity of objects that flowed through the directional pipe (i.e., changed status from the source status bubble's status to the destination status bubble's status) during particular time intervals. In order to generate such a graphic, in an embodiment of the invention, the device performs a technique to determine, for each such time interval, the quantity of objects that changed status in this manner. The technique can use historical database snapshots, discussed above, in order to make this determination, for example, although embodiments of the invention are not limited to databases. In alternative embodiments of the invention, the device can similarly perform the technique based on unstructured data. The snapshots can include a separate snapshot for each time point in a series of time points.

Figure 5:
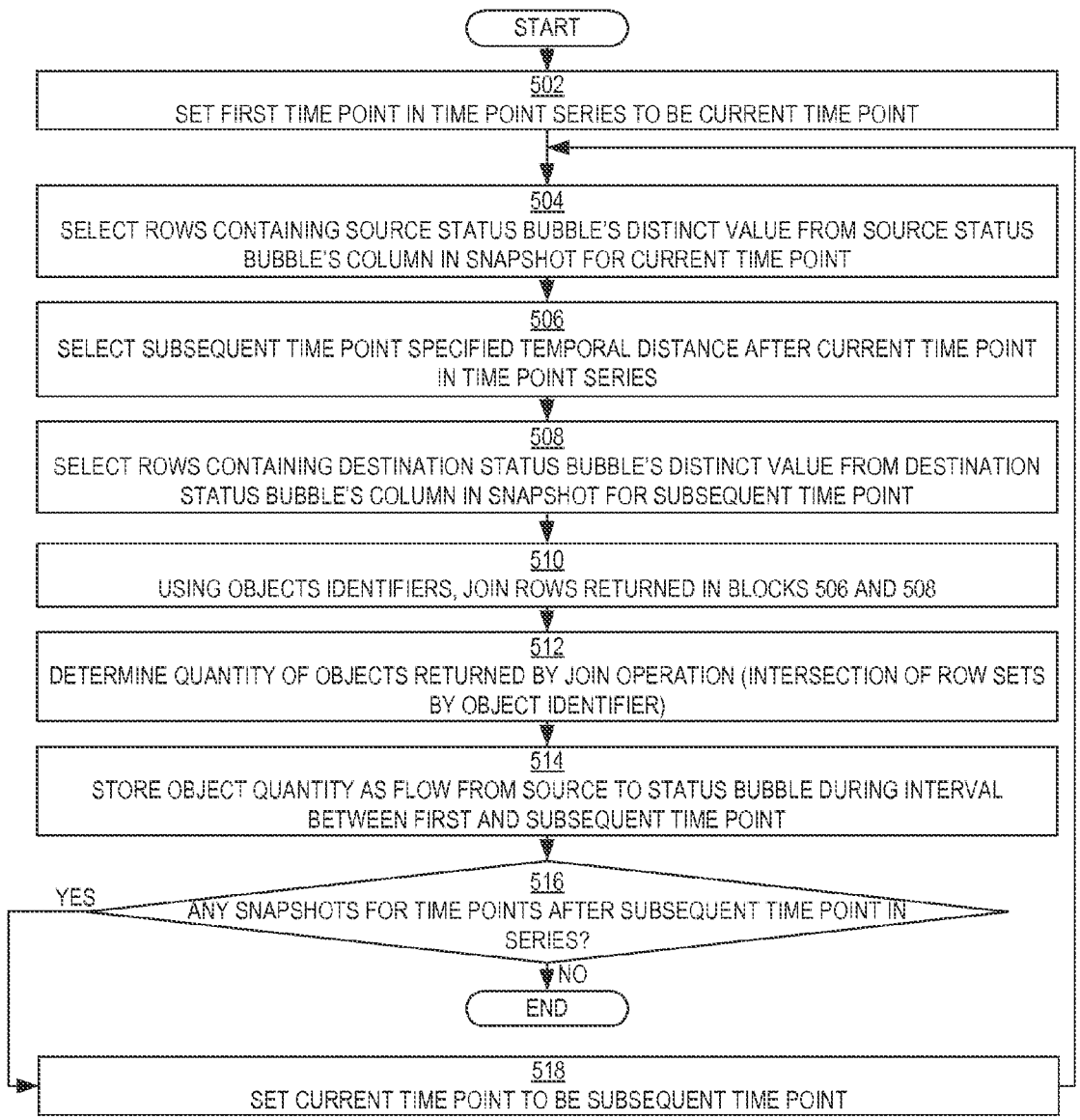
FIG. 5 is a flow diagram that illustrates a technique for determining a quantity of objects that changed status from a specified source status to a specified destination status, according to an embodiment of the invention.

FIG. 5 is a flow diagram that illustrates a technique for determining a quantity of objects that changed status from a specified source status to a specified destination status, according to an embodiment of the invention. In block 502, a computing device sets a first time point in a series of time points to be the current time point. In block 504, the device queries a snapshot corresponding to the current time point to select rows that contain the source status bubble's distinct value in the column corresponding to the source status bubble. In block 506, the device selects, from the series of time points, a subsequent time point that is a specified temporal distance later than the current time point. This temporal distance can be user-specified or otherwise configured, depending on the desired granularity of information. In block 508, the device queries a snapshot corresponding to the subsequent time point to select rows that contain the destination status bubble's distinct value in the column corresponding to the destination status bubble. It is possible that not all of the objects that flowed from the source status bubble flowed to the destination status bubble; if the source status bubble is linked by directional pipes to multiple destination bubbles, then it is possible that some of the objects that flowed from the source status bubble might have flowed to status bubbles other than the destination status bubble. In block 510, using unique object identifiers (e.g., bug identifiers) specified within the rows returned by the queries of blocks 506 and 508, the device performs a join of the query results in order to obtain a set of rows for objects that were represented in both sets of query results—the intersection of the result sets based on unique object identifier. The result of the join is the set of objects that possessed the source status bubble's status as of the current time point but possessed the destination status bubble's status as of the subsequent time point, indicating that these objects changed status from the source status to the destination status in the temporal interval occurring between the first and subsequent time points. In block 512, the device determines the quantity of objects returned by the join operation. In block 514, the device stores this quantity as the number of objects that flowed from the source status bubble to the destination status bubble during the temporal interval occurring between the first and subsequent time points. In block 516, the device determines whether any snapshots for a time point occurring later than the subsequent time point exist. If so, then control passes to block 518. Otherwise, the technique illustrated in FIG. 5 concludes.

In block 518, the device sets the current time point to be the subsequent time point that was selected in block 506. Control passes back to block 504. After the technique of FIG. 5 concludes, the device can use the object quantities determined and stored for each time interval to generate the graphic that illustrates how objects flowed through the directional pipe over time.

Auto Draw Flow

As is discussed above, one technique for generating a flow involves a user selecting device-recommended statuses and dragging those statuses into a flow region of a user interface, and potentially supplementing those statuses with additional statuses selected by user query and/or derived by user specifications. Various techniques, also discussed above, exist for linking status bubbles together with directional pipes in the flow region of the user interface.

Discussed below is a technique wherein a flow can be generated in a more automated manner. Using this technique, a user is not required to decide which statuses ought to be included the flow. Instead, using this technique, the device can automatically attempt to determine the most significant statuses in the system, and include those statuses in the flow. Additionally, using this technique, a user is not required to design the on-screen layout of the flow in the flow region of the user interface. Instead, using this technique, a device can attempt to ensure that the most important or interesting parts of a flow will be positioned centrally within the flow region, ideally so that as much of the flow as possible will be visible at once, but in any case so that scrolling is only required to view less significant portions of the flow. Beneficially, use of this technique avoids a need for the user to have a high familiarity with the statuses that objects in the system can assume or with the manner in which those statuses tend to change in the system. Use of this technique can allow users to visualize parts of flows whose existence those users might not have otherwise considered on their own.

According to one embodiment of the invention, flows can be automatically generated and drawn using the technique at different levels of refinement or "zoom." In an embodiment, the level of refinement at which the flow will be automatically generated and drawn using this technique can be user-specified. Such a level of refinement can involve two different dimensions, which can be separately specified: first, network depth, which can affect the length of chains of connected status bubbles that will be included in the flow; and second, detail, which can affect the threshold at which connections (i.e., directional pipes) between bubbles are deemed to be significant enough, based on the quantity of objects flowing along those connections, to be included in the flow.

Figure 6:
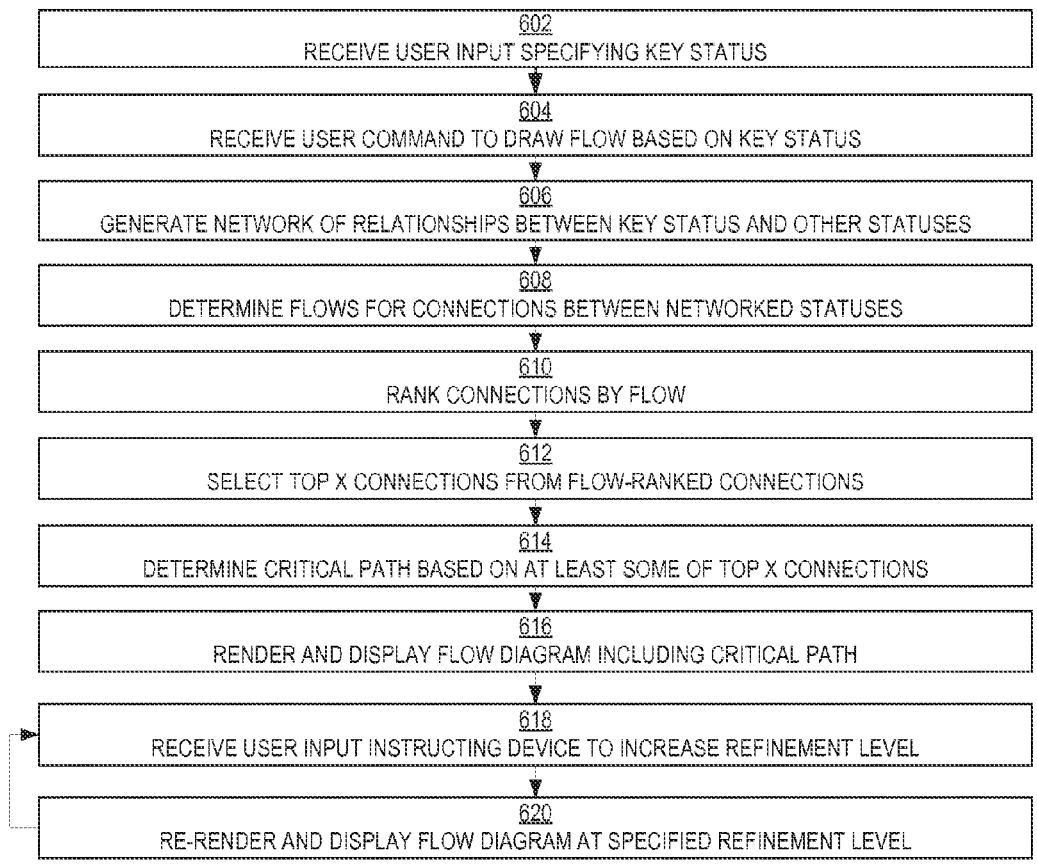
FIG. 6 is a flow diagram illustrating a high-level overview of a technique for automatically generating and visually rendering a flow of statuses of objects in a system, according to an embodiment of the invention.

FIG. 6 is a flow diagram illustrating a high-level overview of a technique for automatically generating and visually rendering a flow of statuses of objects in a system, according to an embodiment of the invention. In block 602, the device receives user input specifying a key status. In an embodiment, the device can present a list of possible object statuses to the user (e.g., using a technique similar to that described above in connection with FIG. 1), and the user can select the key status from that list. In block 604, the device receives user input commanding the device to automatically draw a flow based on the key status. For example, the user can give the command by activating, in a user interface, a button labeled "auto draw flow." In block 606, the device generates a network of relationships between the key status and one or more other statuses. This generation is described in greater detail in connection with FIG. 7 below. In block 608, the device determines flows for the connections between the networked statuses determined in block 606. For each connection between the networked statuses, a quantity of objects that flowed through that connection during a specified time period (e.g., the time period specified in block 704 of FIG. 7) is determined. This quantity becomes the "flow" for that connection. The flow for a connection may be determined using a technique similar to that discussed above in connection with FIG. 5, for example.

In block 610, the device ranks the connections based on their flow. In block 612, the device uses the ranking of block 610 to select, from all of the connections, the top X connections ranked by flow, where X is user-configurable. X can be a specified quantity or a specified percentage. In one embodiment, the device can select at least a specified minimum quantity of connections if the size of the set of top X connections is not at least this minimum quantity. In block 614, the device determines a critical path based on at least some of the top X connections. This determination is described in greater detail in connection with FIG. 8 below. In block 616, the device renders and displays a flow diagram that includes the critical path. The flow diagram can be rendered and displayed initially at a specified level of refinement or "zoom." The rendering is described in greater detail below. In block 618, the device can receive user input that instructs the device to increase the detail of the whole flow diagram or a selected status thereof. In block 620, the device re-renders and displays the flow diagram at a level of refinement specified by the user input received in block 618. Control passes back to block 618.

Generating the Network of Relationships

As is discussed above in connection with block 606 of FIG. 6, in one embodiment, a device generates a network of relationships between the key status and one or more other statuses. In an embodiment, the device generates a network of (a) all statuses that an object's status historically has directly changed to from the key status and (b) all statuses from which an object's status historically has directly changed to the key status. In other words, the device can determine automatically the set of all other status bubbles that ought to (based on recorded past status changes) have directional pipes leading directly from or directly from the status bubble for the key status. Historical data can be observed to determine the statuses to which objects have moved and from which objects have moved in the past.

Figure 7:
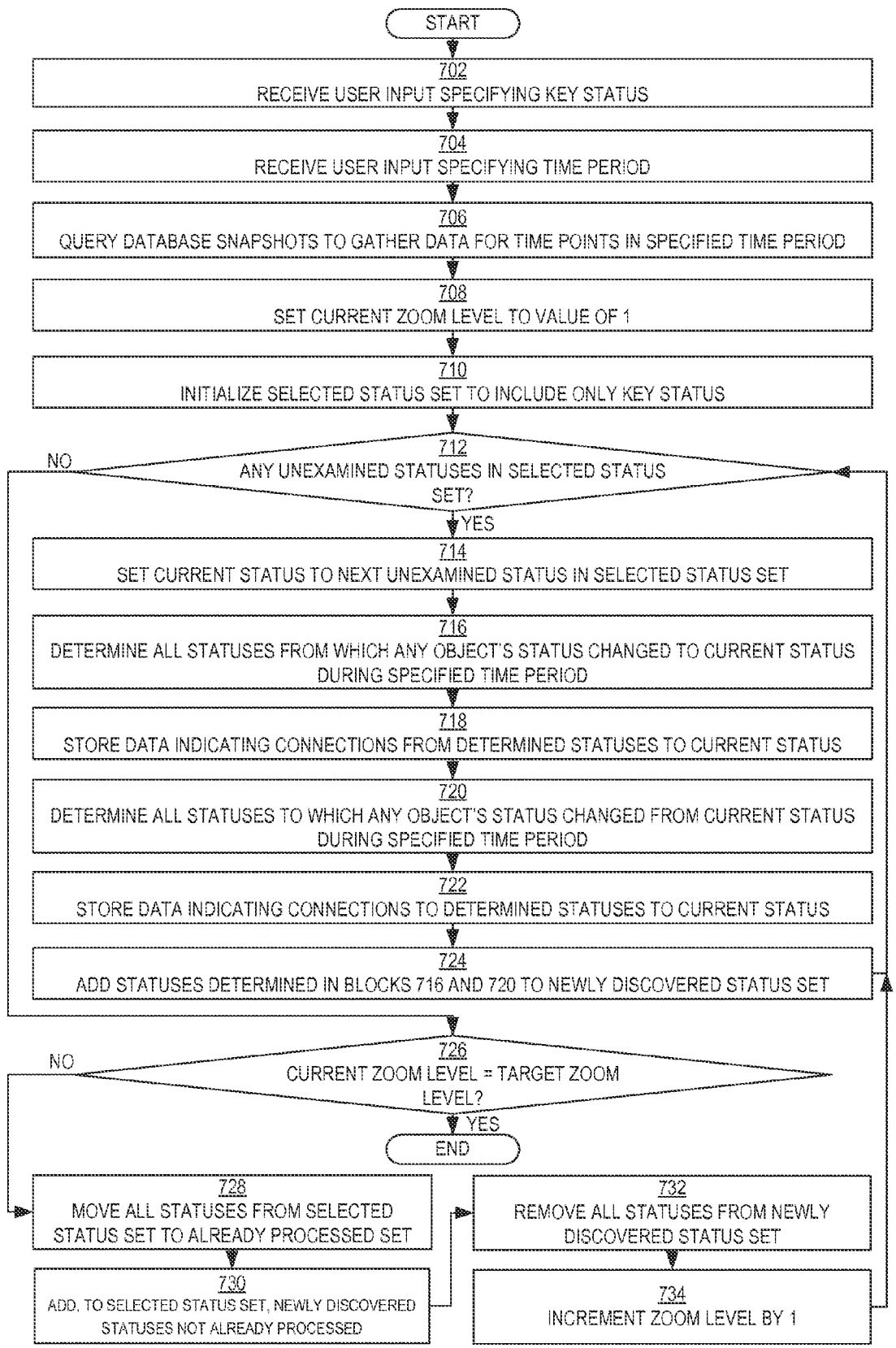
FIG. 7 is a flow diagram illustrating a technique for automatically generating a network of statuses that are directly connected with a specified key status, according to an embodiment of the invention.

FIG. 7 is a flow diagram illustrating a technique for automatically generating a network of statuses that are directly connected with a specified key status, according to an embodiment of the invention. In block 702, the device receives user input specifying a key status (as in block 602 of FIG. 6). In block 704, the device receives user input specifying a time period. In block 706, the device queries database snapshots to gather data pertaining to time points in the specified time period. Alternatively, the device can analyze snapshot data obtained from some other data source. In block 708, the device initially sets a current refinement or "zoom" level to be a value of one. In block 710, the device initializes a set of selected statuses to include only the key status.

In block 712, the device determines whether the set of selected statuses includes any statuses that the device has not yet examined. If so, then control passes to block 714. Otherwise, control passes to block 726.

In block 714, the device sets the current status to be a status in the set of selected statuses that the device has not yet examined. In block 716, the device determines all statuses from which any object's status changed to the current status during the time period specified in block 704. In an embodiment, this determination can be accomplished by examining the data gathered in block 706 and finding all objects that possessed some other status immediately prior to possessing the current status. These other statuses are then those determined in block 716. In block 718, the device stores data indicating connections from each such other status to the current status. In block 720, the device determines all statuses to which any object's status changed from the current status during the time period specified in block 704. In an embodiment, this determination can be accomplished by examining the data gathered in block 706 and finding all objects that possessed the current status immediately prior to possessing some other status. These other statuses are then those determined in block 720. In block 722, the device stores data indicating connections from the current status to each such other status. In block 724, the device adds, to a set of newly discovered statuses, all statuses determined in blocks 716 and 720 that have never previously been within the set of selected statuses. Control passes back to block 712.

Alternatively, in block 726, the device determines whether the current refinement or "zoom" level is equal to a specified target refinement or "zoom" level. The target refinement or "zoom" level can be user-specified or otherwise configured. If the current refinement or "zoom" level is equal to the target refinement or "zoom" level, then the technique concludes, having automatically generated a set of significant statuses and the connections between them. Otherwise, control passes to block 728.

In block 728, the device moves all statuses from the set of selected statuses to an "already processed" status set, keeping track of which statuses have been in that set so those statuses will not be added to the set of newly discovered statuses in the future. In block 730, the device adds, to the set of selected statuses, all statuses from the set of newly discovered statuses that are not in the "already processed" status set. In block 732, the device removes all statuses from the set of newly discovered statuses. In block 734, the device increments the current refinement or "zoom" level by one. Control passes back to block 712.

Determining the Critical Path

Figure 8:
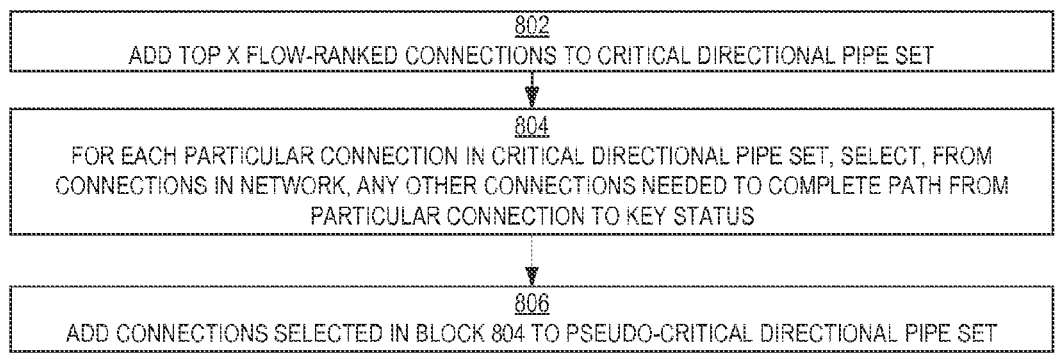
FIG. 8 is a flow diagram illustrating an example of a technique for automatically determining a critical path within a network of interconnected statuses, according to an embodiment of the invention.

As is discussed above in connection with block 614 of FIG. 6, in one embodiment, a device determines a critical path based on at least some of the top X flow-ranked connections between statuses. FIG. 8 is a flow diagram illustrating an example of a technique for automatically determining a critical path within a network of interconnected statuses, according to an embodiment of the invention. In block 802, the device adds, to a set of critical directional pipes, the top X flow-ranked connections determined in block 612 of FIG. 6. In block 804, for each particular connection in set of critical directional pipes, the device selects, from the set of connections generated for the network in block 606, any other connections needed to complete a path from the particular connection to the key status (specified in block 602 of FIG. 6), if such a path does not already exist. In block 806, the device adds the connections selected in block 606 to a set of pseudo-critical directional pipes. As a result of this technique, the set of critical directional pipes contains the connections that form the critical path, and the set of pseudo-critical directional pipes contains connections that provide context to the critical path.

Rendering the Flow Diagram

As is discussed above in connection with block 616 of FIG. 6, in an embodiment, a device can render and display a flow diagram that includes the critical path determined using the technique discussed above in connection with FIG. 8. A technique for rendering the flow diagram is described below. The technique operates on a set of principles. According to these principles, the technique attempts to keep the critical path centered in the user interface. Additionally, the technique attempts to keep the status bubble for the key status (specified in block 602 of FIG. 6) centered as much as possible while conforming to the former principle. The technique attempts to avoid the need to scroll the user interface to see any portion of the critical path. In an embodiment, the technique attempts to lay out the flow diagram in a manner that reduces vertical scrolling in favor of horizontal scrolling if any scrolling is necessary to view any part of the flow diagram. In generating the flow diagram, the device can render each connection in the sets of critical and pseudo-critical directional pipes, as well as each status bubble for each status that those pipes interconnect. Other connections and status bubbles can be omitted from the display.

In an embodiment, the device splits the user interface into a virtual grid. The construction of the virtual grid can be based on configurable parameters such as a maximum resolution for the flow diagram and the minimum size in pixels required for each status bubble. The device can initially attempt to generate the flow diagram with a generally linear appearance. The device can attempt to generate the flow diagram so that the status bubbles connected by the critical directional pipes and pseudo-critical directional pipes occur as much as possible on the same straight line. After generating the flow diagram in this manner, the device can determine whether any part of the flow diagram will extend beyond the borders of the user interface. If so, to prevent the need for scrolling, the device can bend that part of the flow diagram in a perpendicular direction, so that more of the "real estate" of the user interface is occupied by the flow diagram.

Leaks

The rendering process discussed above can obscure some details about the network. Some non-critical directional pipes might be omitted from the display of the flow diagram, for example. As a result, the aggregate flows into and out of a particular status bubble might not be perfectly equal in magnitude; the net of all of the in-flows to out-flows might not be zero as displayed. Such a particular status bubble possesses a "leak." According to an embodiment of the invention, the device can determine, for each status bubble to be rendered, whether that status bubble as displayed will possess a leak. For each such status bubble, the device can display, next to that status bubble and in association with that status bubble, a graphic element that indicates to a viewer that the status bubble as shown possesses a leak. The viewer then becomes aware of the reason for the discrepancy in in-flows and out-flows relative to the status bubble. The user can elect to "zoom in" on that status bubble in order to see a more detailed version of that part of the flow diagram that is less likely to be subject to leaks.

Zoom

As is discussed above, there are two possible ways in which a user can view the flow diagram with greater refinement or "zoom." First, the user can instruct the device to generate the status network in a manner that searches farther away from the key status when discovering other statuses that ought to be added to network based upon which the flow diagram will be rendered. This kind of zoom can be achieved by increasing the target refinement or "zoom" level discussed above in connection with block 726 of FIG. 7. Second, the user can instruct the device to include a larger quantity of the connections that are flow-ranked lower than those previously selected for inclusion in the flow diagram, as discussed above in connection with block 612 of FIG. 6. This kind of zoom can be achieved by increasing the value of X discussed in connection with block 612.

In an embodiment, in response to a user's commands, the device can perform either kind of zoom (as specified by the commands) relative to the whole flow diagram or relative to a user-selected status represented in the flow diagram. In response to such commands, the device can re-generate the status network using revised parameters and can re-render the flow diagram based on the regenerated status network.

Example User Interfaces

Figure 11:
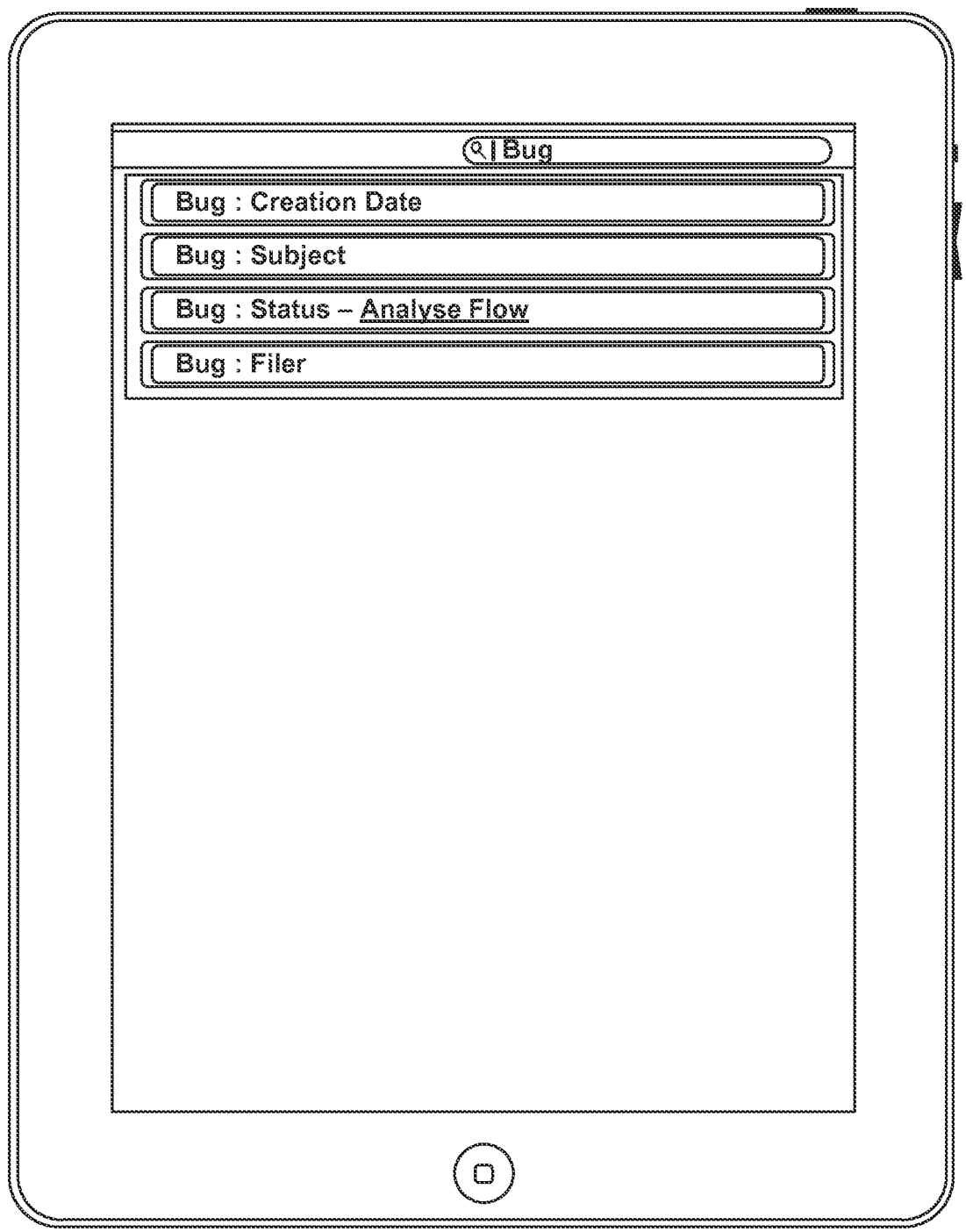
FIG. 11 shows an example of a user interface through which a user can specify a database that a computing device is to search for columns that are most likely to represent object status, according to an embodiment of the invention.

FIG. 11 shows an example of a user interface through which a user can specify a database that a computing device is to search for columns that are most likely to represent object status, according to an embodiment of the invention. As shown, the user interface is displayed on a tablet computing device. The user interface includes a search field. A business user interested in a bug fixing process might enter the word "bug" into the search field. The search results are displayed below the search field. The search results include names of several columns from the bug database. The column names include "bug: status." In this example, a computing device has automatically identified the "bug: status" column as potentially representing object status. Consequently, the computing device has caused the display, next that that column name, of a link labeled "analyse flow." In response to the user's activation of this link, the tablet computing device can present a user interface such as the one illustrated in FIG. 12.

Figure 12:
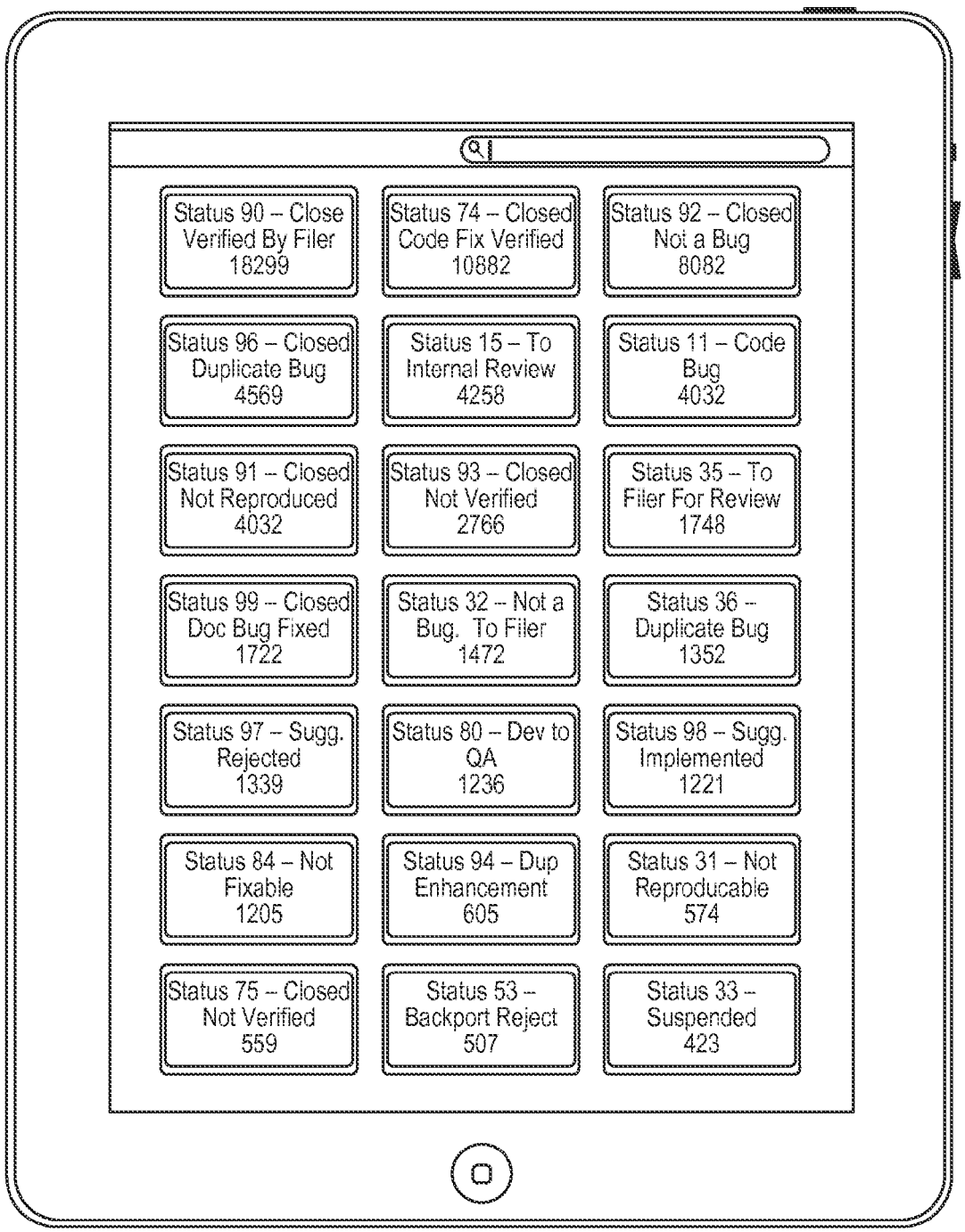
FIG. 12 shows an example of a user interface through which a user can view distinct values from a user-selected relational column in a database, according to an embodiment of the invention.

FIG. 12 shows an example of a user interface through which a user can view distinct values from a user-selected relational column in a database, according to an embodiment of the invention. In response to the user's activation of the "analyse flow" link next to the "bug: status" column name, the computing device can present, to the user, candidate status bubbles that represent the distinct values found within the "bug: status" column. Each candidate status bubble contains a count of the quantity of that bubble's distinct value within the "bug: status" column. The candidate status bubbles can be sorted within the user interface by this count, from highest to lowest.

Figure 13:
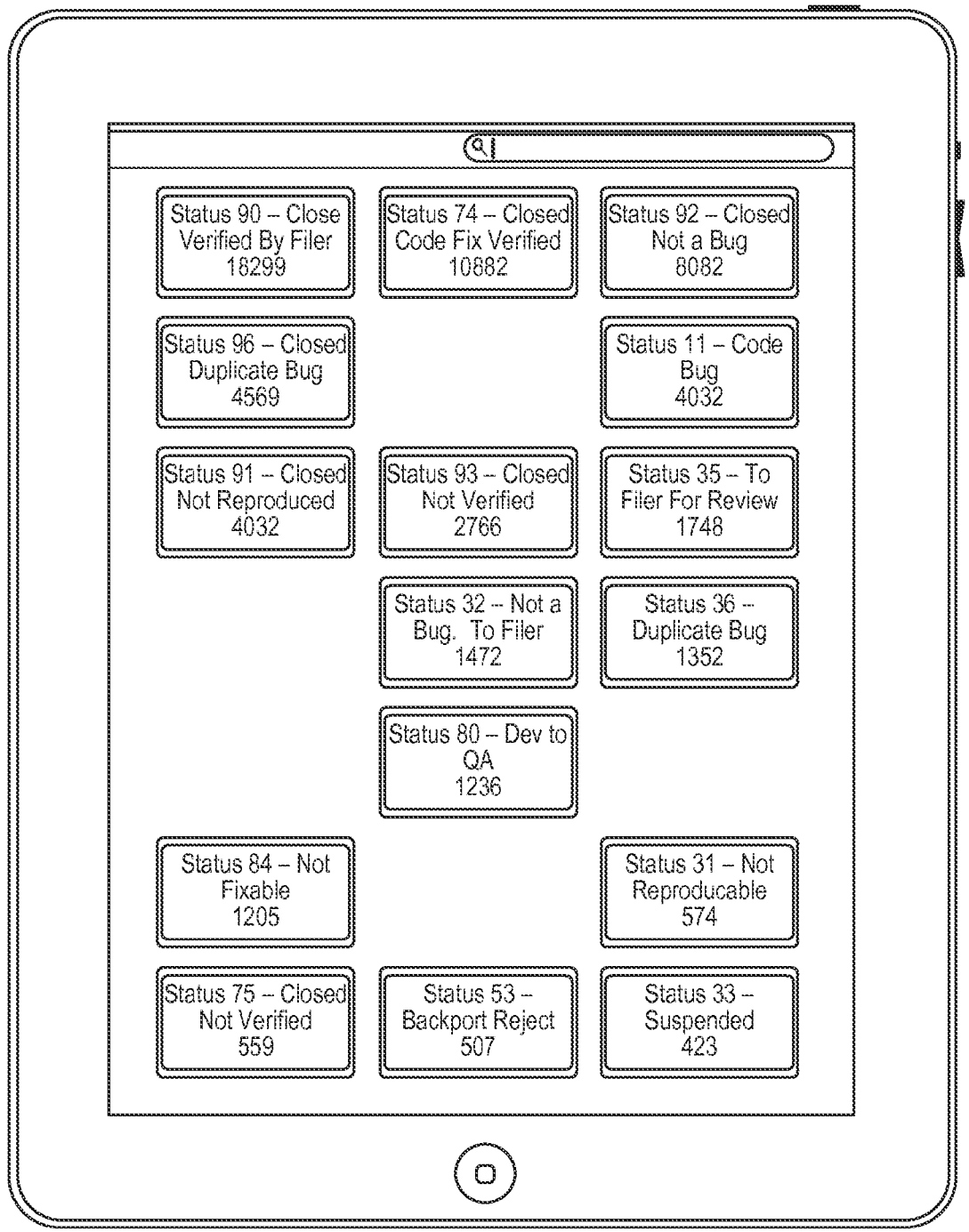
FIG. 13 shows an example of a user interface in which several candidate status bubbles have been removed in response to the user's selection of those bubbles, according to an embodiment of the invention.

In an embodiment, the computing device receives user input that selects one or more candidate status bubbles to be removed from those that ultimately will be included within the flow diagram to be generated. FIG. 13 shows an example of a user interface in which several candidate status bubbles have been removed in response to the user's selection of those bubbles, according to an embodiment of the invention. In this example, the user has decided that he is only interested in tracking code bugs, and so the user has selected candidate status bubbles related to enhancements—distinct values 16, 97, 98, and 94—and documentation—distinct value 99.

Figure 14:
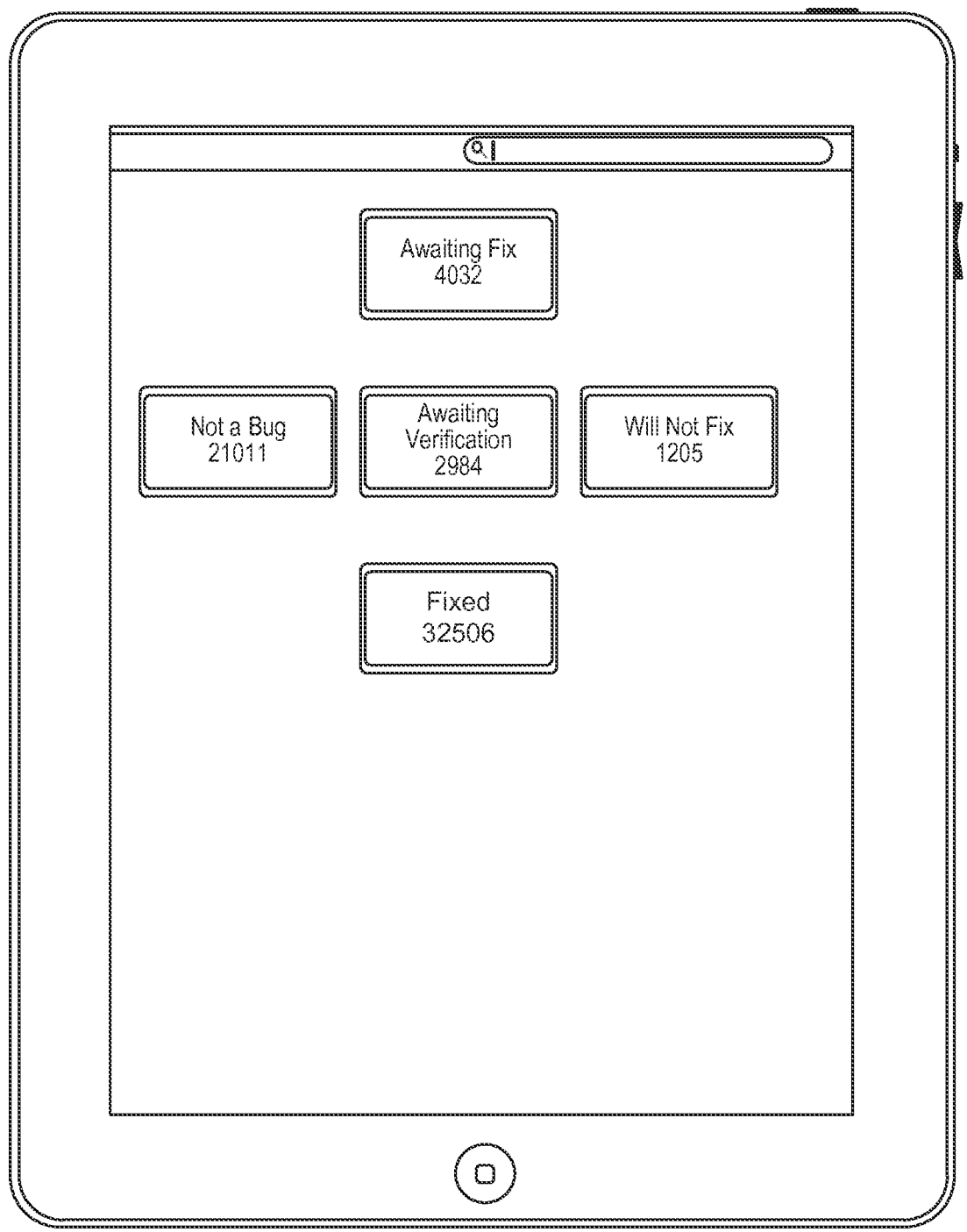
FIG. 14 shows an example of a user interface in which some candidate status bubbles have been merged together as a result of the user dragging those candidate status bubbles onto other candidate status bubbles, according to an embodiment of the invention.

As is discussed above, in an embodiment, the computing device receives user input that merges two or more candidate status bubbles into a single unified status bubble. FIG. 14 shows an example of a user interface in which some candidate status bubbles have been merged together as a result of the user dragging those candidate status bubbles onto other candidate status bubbles, according to an embodiment of the invention. In this example, the user has decided that some of the candidate status bubbles are equivalent for the user's purpose, and so has caused those bubbles to be merged. Additionally, as discussed above, in an embodiment, the statuses that status bubbles represent can be re-named as specified by the user. In this example, the user has caused the creation of combined status bubbles labeled "awaiting fix" (former distinct value 11), "awaiting verification" (merger of former distinct values 35 and 80), "fixed" (merger of former distinct values 74, 75, 90, and 93), and "not a bug" (merger of former distinct values 31, 32, 33, 36, 91, 92, and 96). The counts of the merged status bubbles are equal to the sum of the counts from the status bubbles merged.

Figure 15:
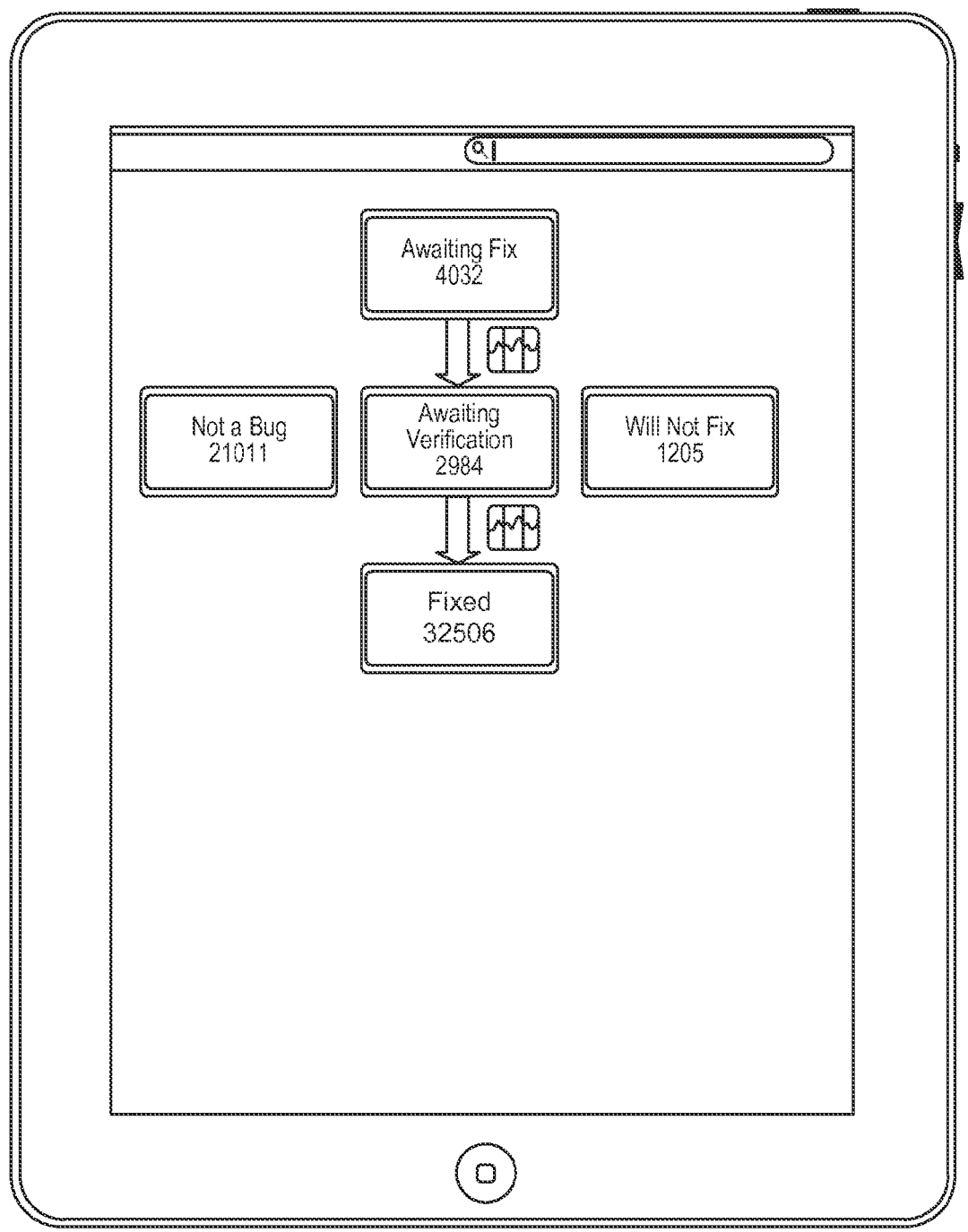
FIG. 15 shows an example of a user interface to which some directional flow pipes have been added to connection some status bubbles with other status bubbles, according to an embodiment of the invention.

FIG. 15 shows an example of a user interface to which some directional flow pipes have been added to connection some status bubbles with other status bubbles, according to an embodiment of the invention. The status bubbles shown are the candidate status bubbles that have been selected for inclusion in the flow diagram. As shown in FIG. 15, the user has decided that he is interested in seeing the flow from the "awaiting fix" status bubble to the "awaiting verification" status bubble, and the flow from the "awaiting verification" status bubble to the "fixed" status bubble. The user has connected these status bubbles with directional flow pipes. As is discussed above, in one embodiment, such pipes can be added through a dragging gesture made against a tablet computing device's touchscreen display. In response to the user's addition of the directional flow pipes, the computing device has calculated a history of flows between the corresponding statuses based on historical database snapshots. Next to each directional flow pipe, the computing device has displayed a two-dimensional line chart graphic showing how flow from the source status to the destination status has varied over time.

Figure 16:
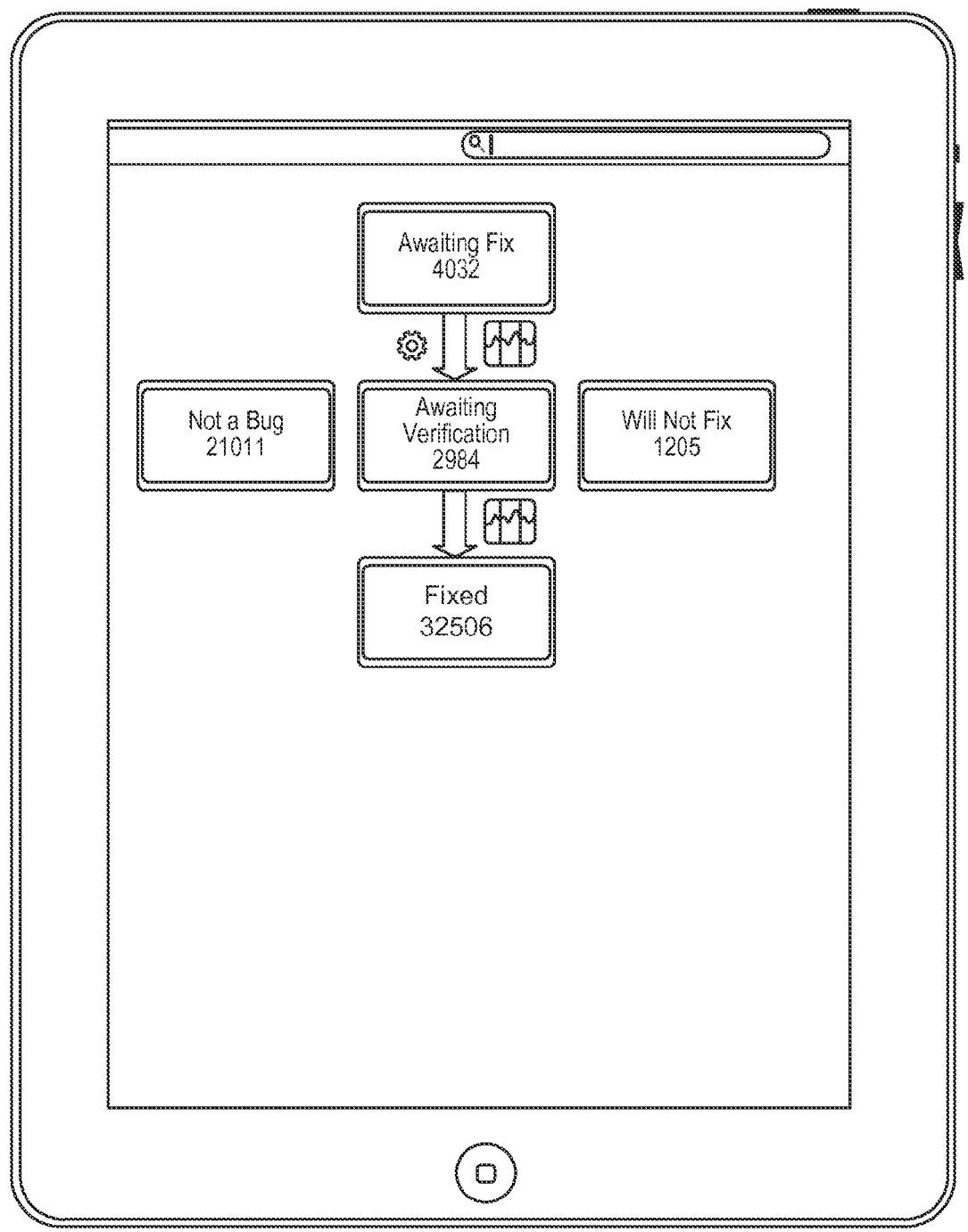
FIG. 16 is an example of a user interface in which an alert graphic (shown as a gear) has been placed next to a particular directional flow pipe to signify that a user-specified alert is associated with that pipe, according to an embodiment of the invention.

In one embodiment of the invention, in response to a user's command, a computing device can associate a user-specified action with a user-specified directional flow pipe. FIG. 16 is an example of a user interface in which an alert graphic (shown as a gear) has been placed next to a particular directional flow pipe to signify that a user-specified alert is associated with that pipe, according to an embodiment of the invention. In this example, the user has instructed the computing device to associate, with the pipe connecting the "awaiting fix" status bubble to the "awaiting verification" status bubble, an alert that will be triggered in response to user-specified criteria being satisfied. In this example, the user-specified criteria are satisfied if the quantity of bugs having the "awaiting fix" status exceed the quantity of bugs that flowed from the "awaiting fix" status to the "awaiting verification" status within a most recent week-long time interval. The alert can be in the form of an e-mail or other message to the user. Alternatively, the alert can appear on the user interface. For example, the directional pipe associated with the alert can be made to appear in a red color when the criteria are satisfied. Such an alert can inform the user that a dangerously high backlog of bugs is being built up, which the user might not have the work capacity to reduce.

Figure 17:
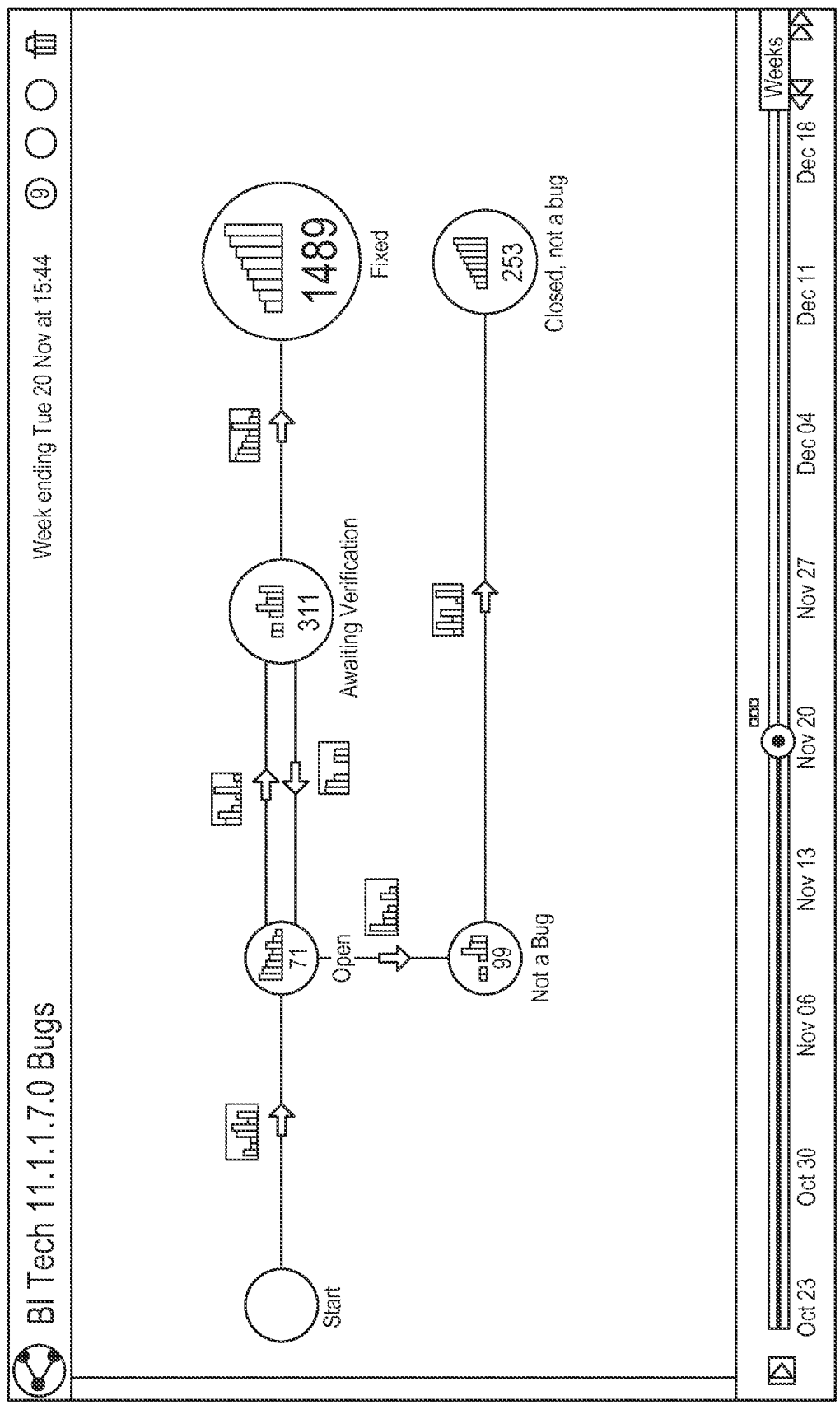
FIG. 17 is an example of a user interface displaying an example flow diagram for a bug resolution process, according to an embodiment of the invention.

FIG. 17 is an example of a user interface displaying an example flow diagram for a bug resolution process, according to an embodiment of the invention.

Figure 18:
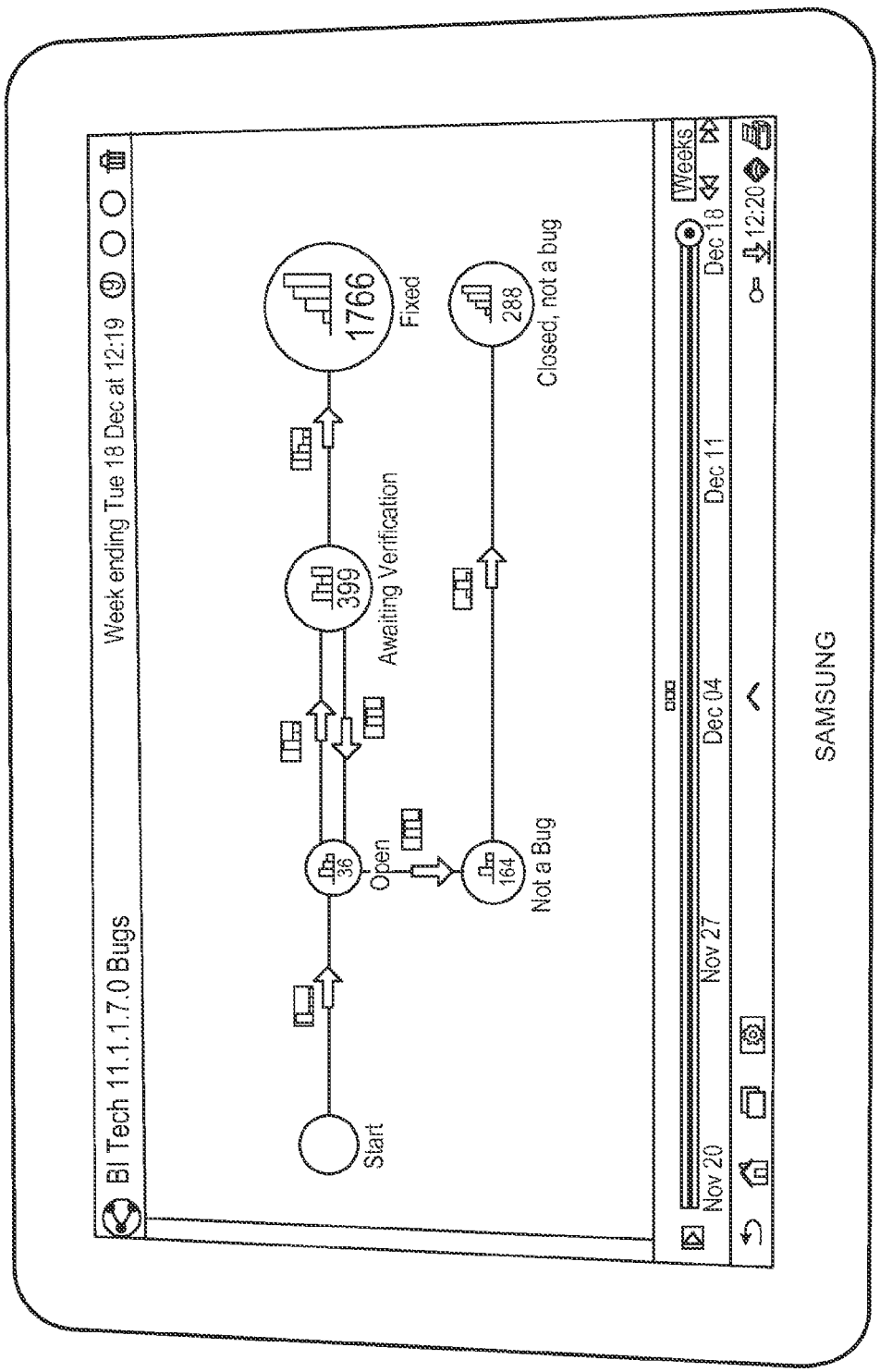
FIG. 18 is another example of a user interface displaying an example flow diagram for a bug resolution process, according to an embodiment of the invention.

FIG. 18 is another example of a user interface displaying an example flow diagram for a bug resolution process, according to an embodiment of the invention. The status bubbles show counts for the quantities of bugs possessing those bubble's statuses. The statuses of the bugs flow from the "open" status to the "awaiting verification status" to the "fixed" status. The sizes of the status bubbles change in proportion to the quantity of bugs possessing those bubble's statuses. The bar chart inside each status bubble shows a history of the count of bugs possessing that bubble's status over time. Next to each directional pipe connecting the status bubbles is a bar chart showing the historical flow rates between the connected status bubbles. The flow diagram reflects the state of the system at a particular time point; in this example, the time point is Dec. 18, 2012. At this time point, most bugs are fixed, but many are awaiting verification.

Figure 19:
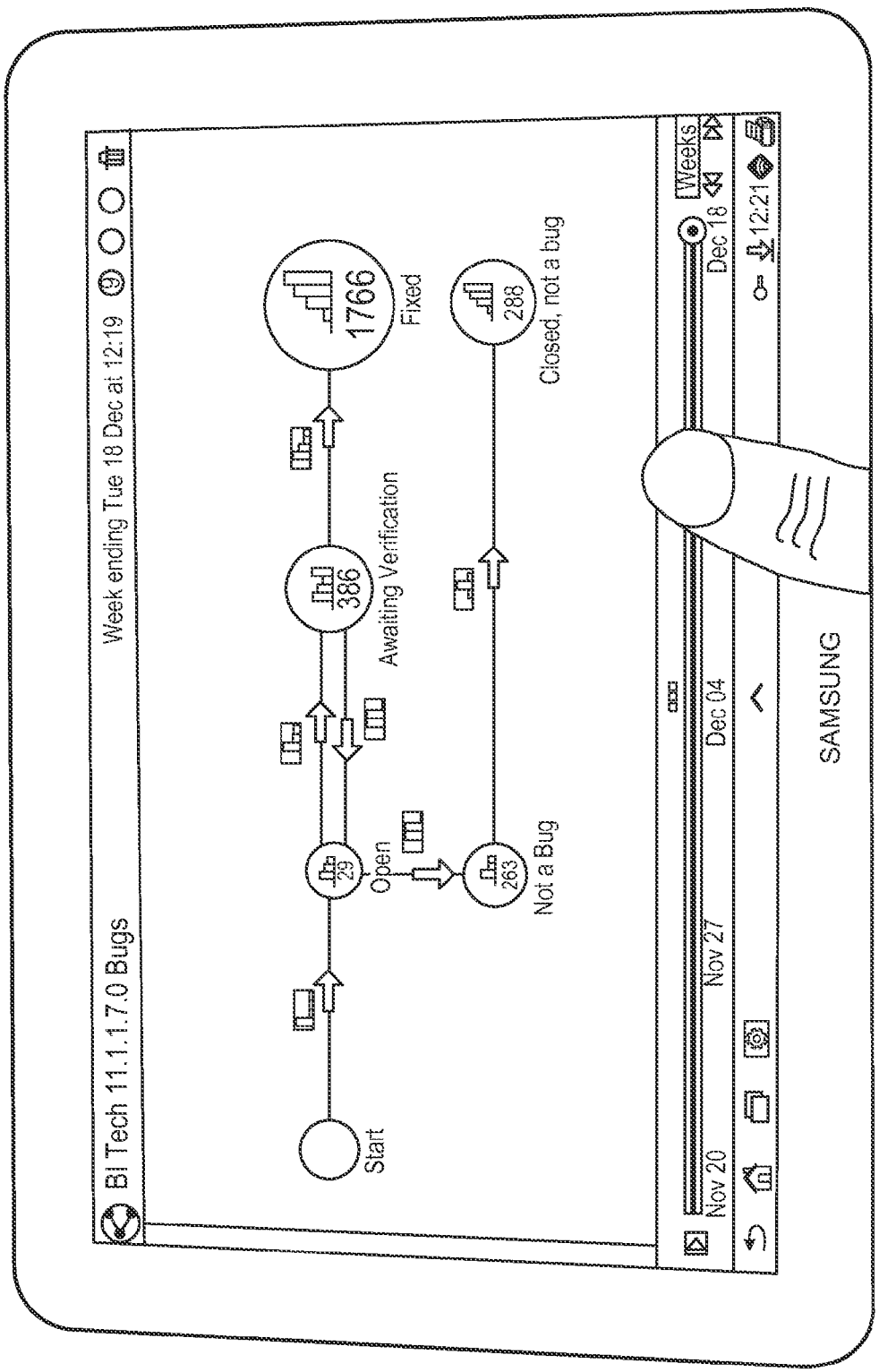
FIG. 19 is an example of a user interface in which a user is dragging a current time point to a new position on a displayed timeline, according to an embodiment of the invention.

FIG. 19 is an example of a user interface in which a user is dragging a current time point to a new position on a displayed timeline. By dragging the current time point to a position representing a previous moment in time, the user can view the state of the system at an earlier time point, according to an embodiment of the invention.

Figure 20:
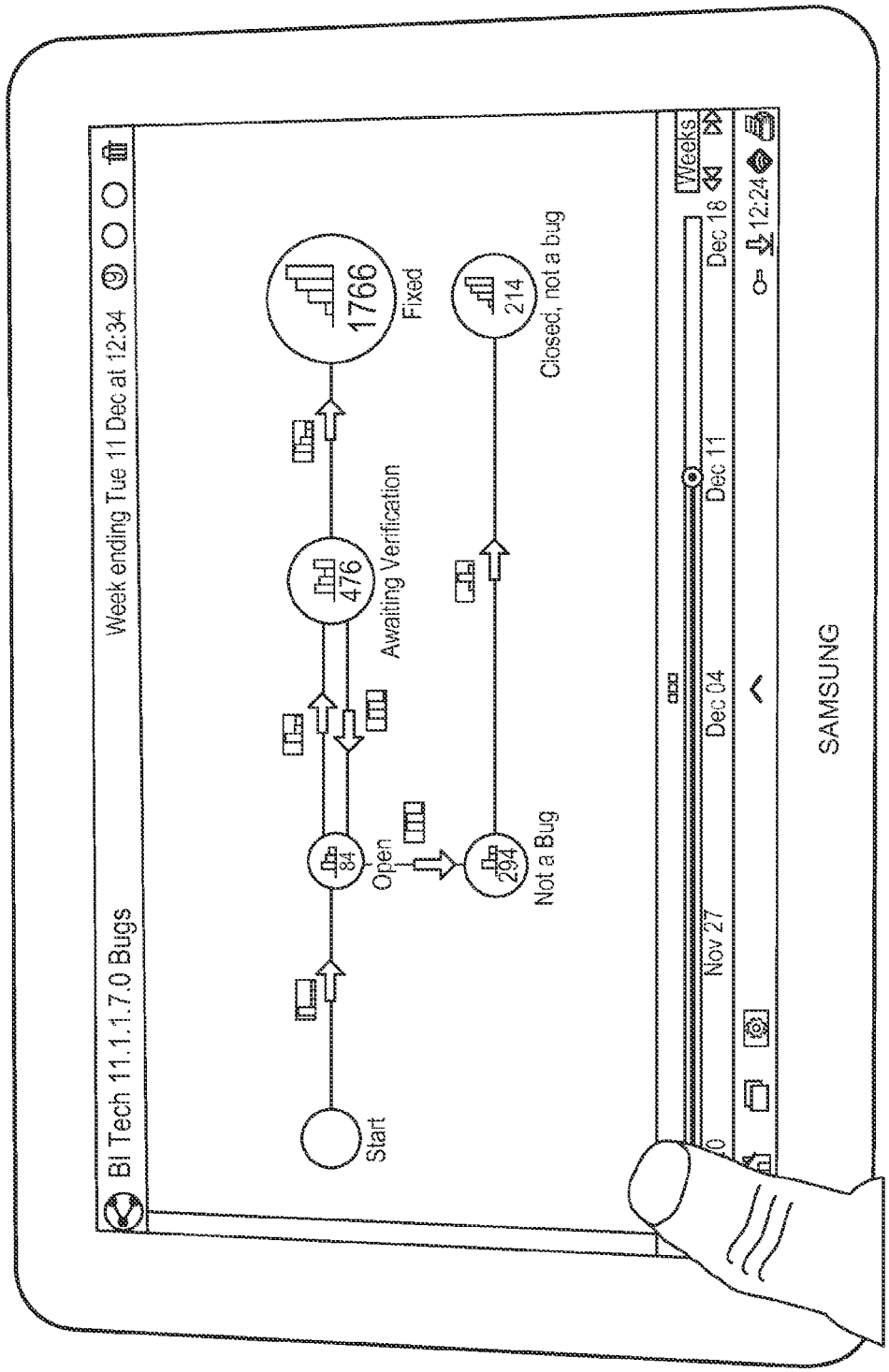
FIG. 20 is an example of a user interface in which a user is selecting an earlier point on the displayed timeline, according to an embodiment of the invention.

FIG. 20 is an example of a user interface in which a user is selecting an earlier point on the displayed timeline, according to an embodiment of the invention.

Figure 21:
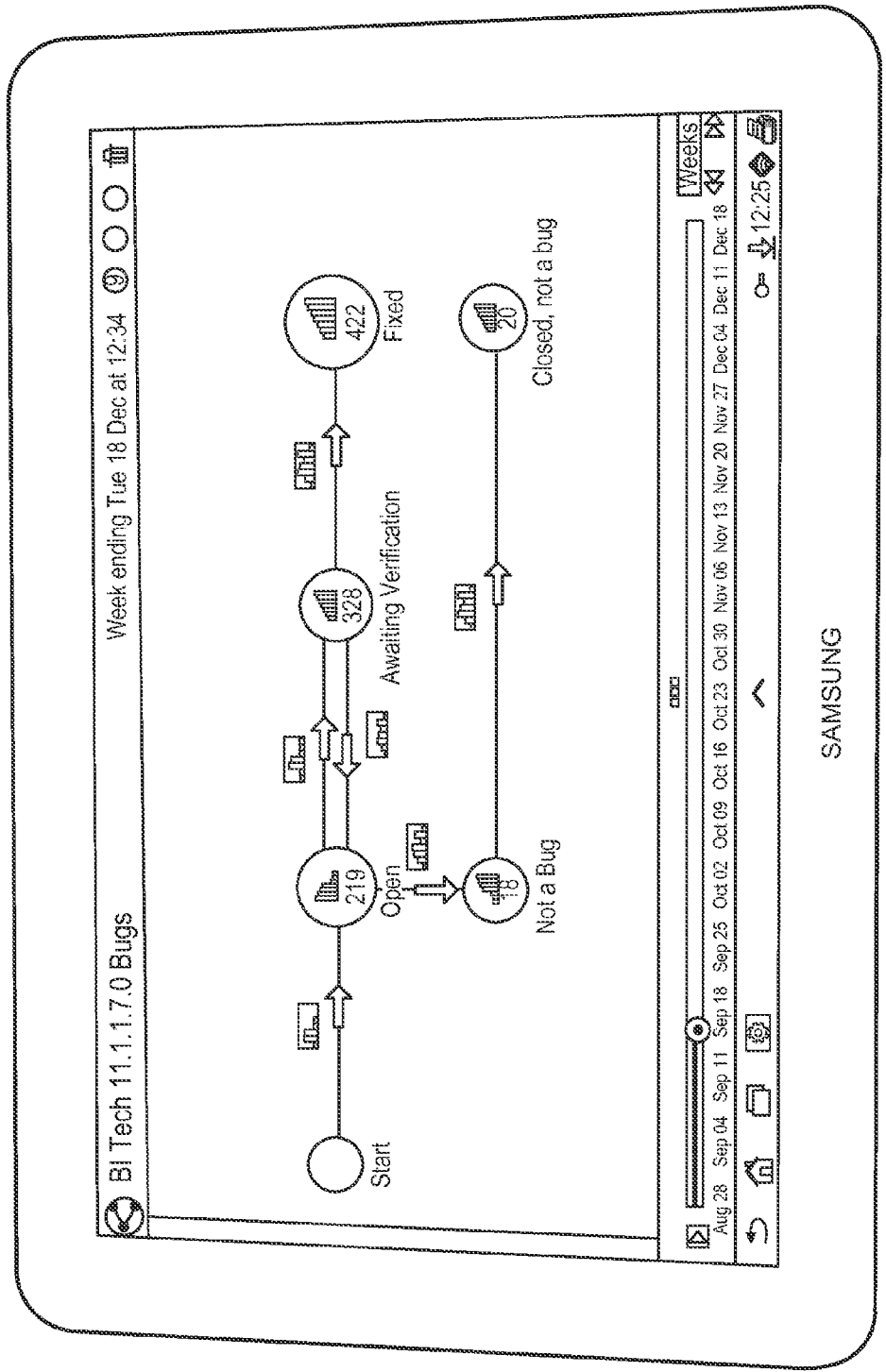
FIG. 21 is an example of a user interface showing the state of the flow diagram at an earlier point in time, according to an embodiment of the invention.

FIG. 21 is an example of a user interface showing the state of the flow diagram at an earlier point in time, according to an embodiment of the invention. In mid-September, the count of bugs is shown to rise rapidly.

Figure 22:
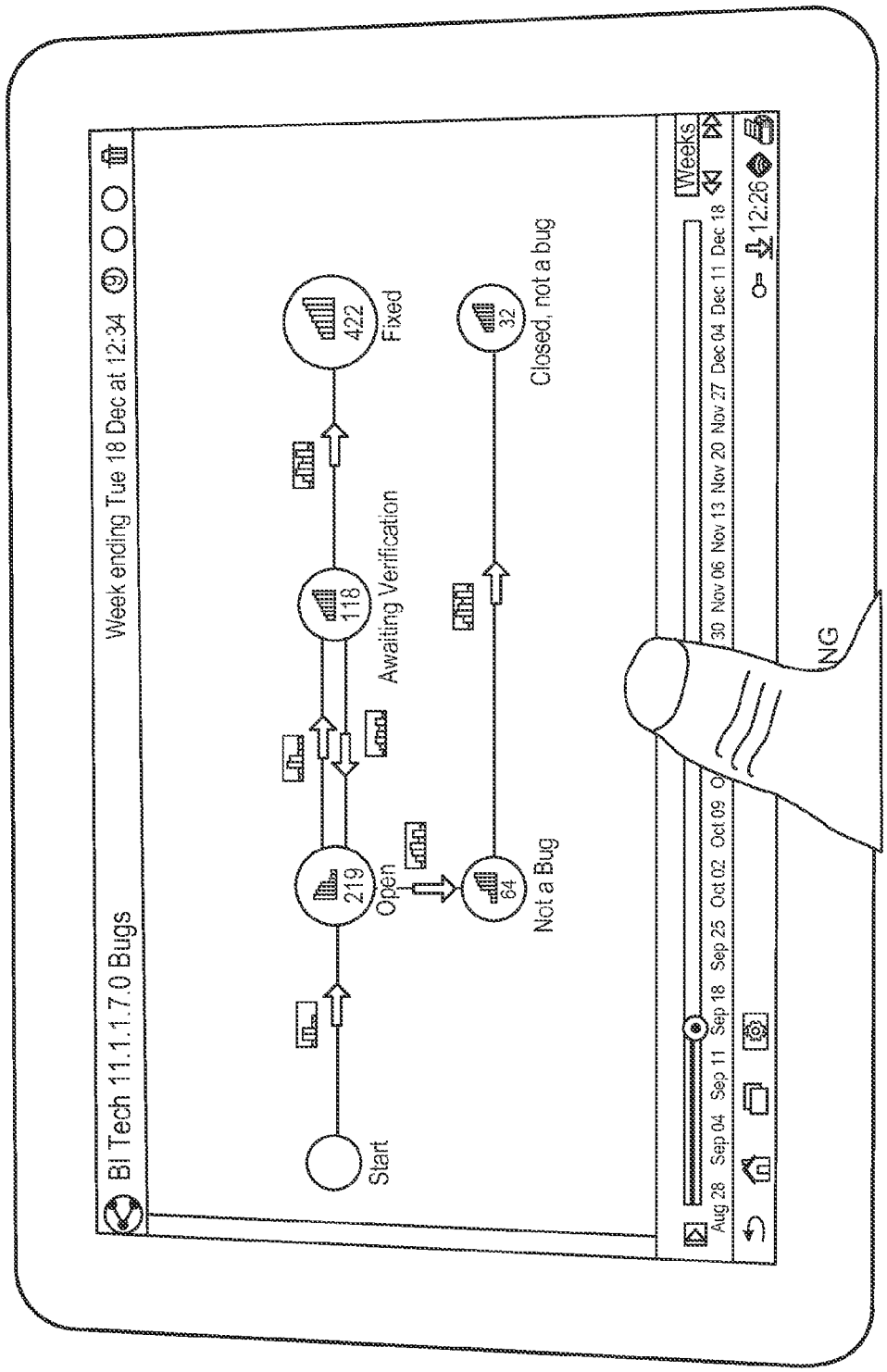
FIG. 22 is an example of a user interface showing a user's activation of a portion of the user interface that causes an annotation entry mechanism to appear on the user interface, according to an embodiment of the invention.

In one embodiment of the invention, the user interface provided a mechanism through which a user can add an annotation to a specific time point in the flow's history. FIG. 22 is an example of a user interface showing a user's activation of a portion of the user interface that causes an annotation entry mechanism to appear on the user interface, according to an embodiment of the invention.

Figure 23:
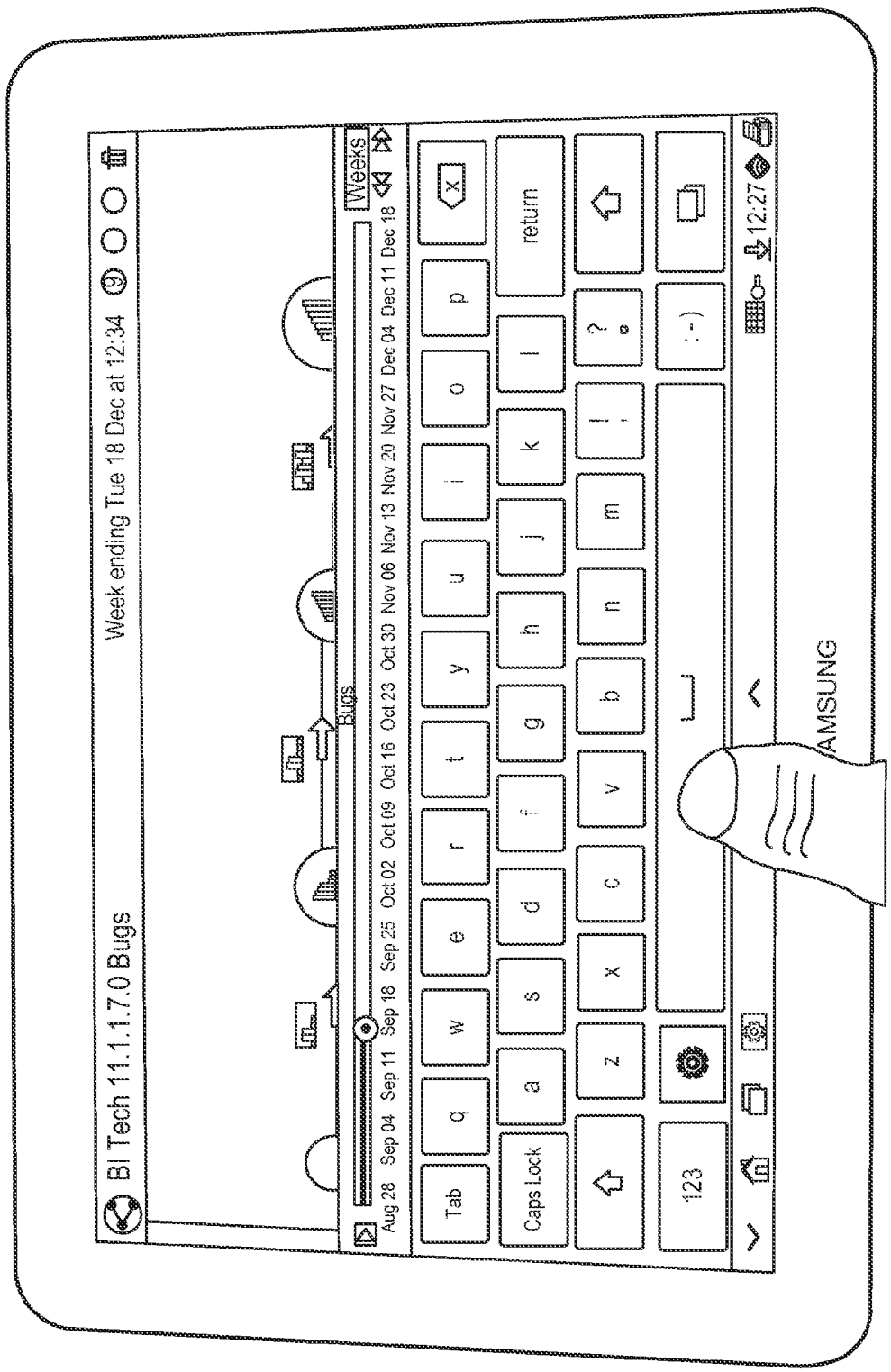
FIG. 23 is an example of a user interface containing an annotation entry mechanism, according to an embodiment of the invention.

FIG. 23 is an example of a user interface containing an annotation entry mechanism, according to an embodiment of the invention. As shown, the user is touching various virtual keys displayed on a virtual keyboard in order to add an annotation to the current time point in the flow's history.

Figure 24:
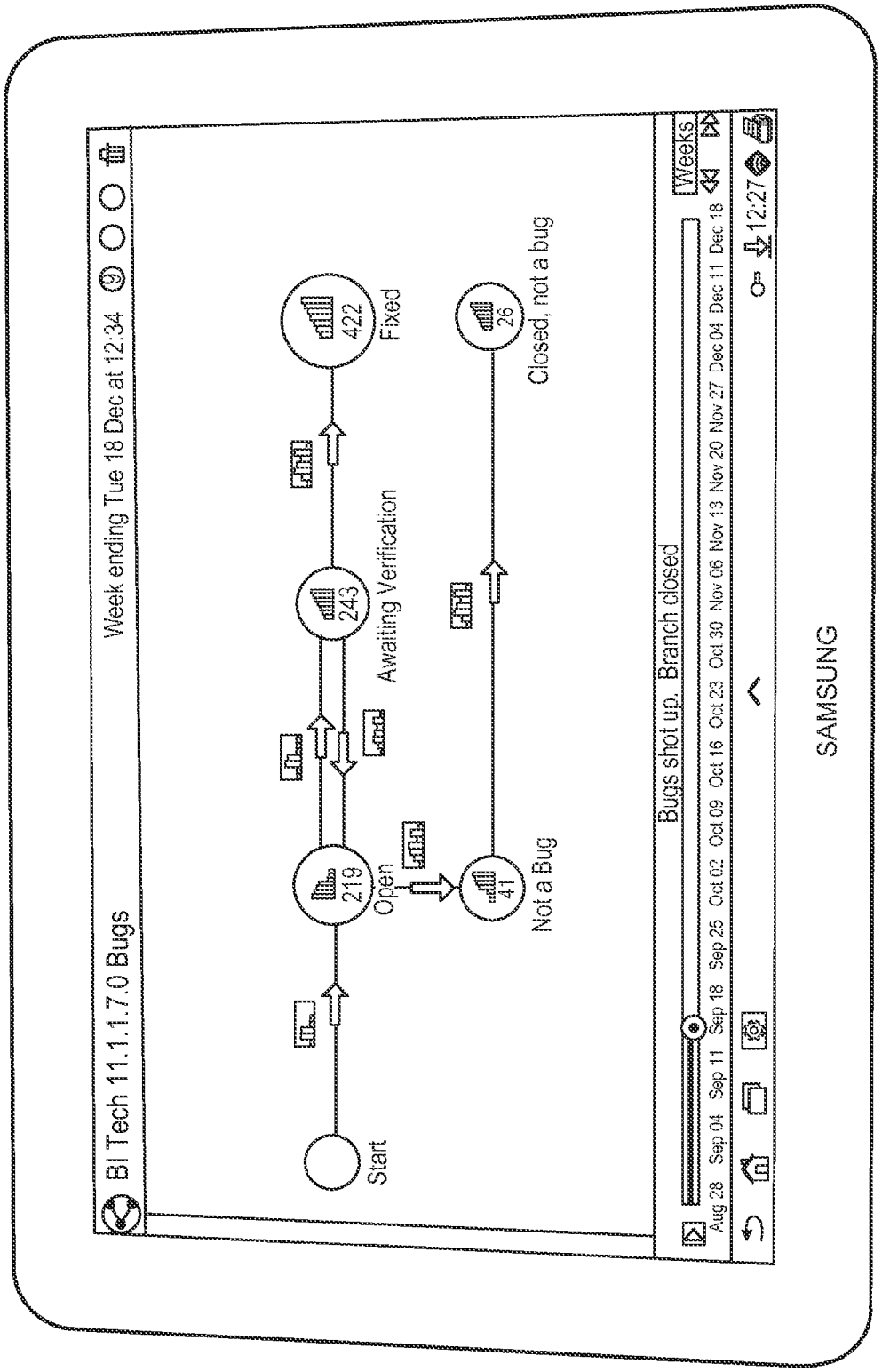
FIG. 24 is an example of a user interface in which an annotation has been added to the current time point in the flow's history, according to an embodiment of the invention.

FIG. 24 is an example of a user interface in which an annotation has been added to the current time point in the flow's history, according to an embodiment of the invention. As shown, the explanatory annotation, "Bugs shot up; Branch closed" has been associated with the current time point. In an embodiment, this annotation is presented thereafter whenever the state of the flow diagram at that time point is displayed.

Hardware Overview

Figure 9:
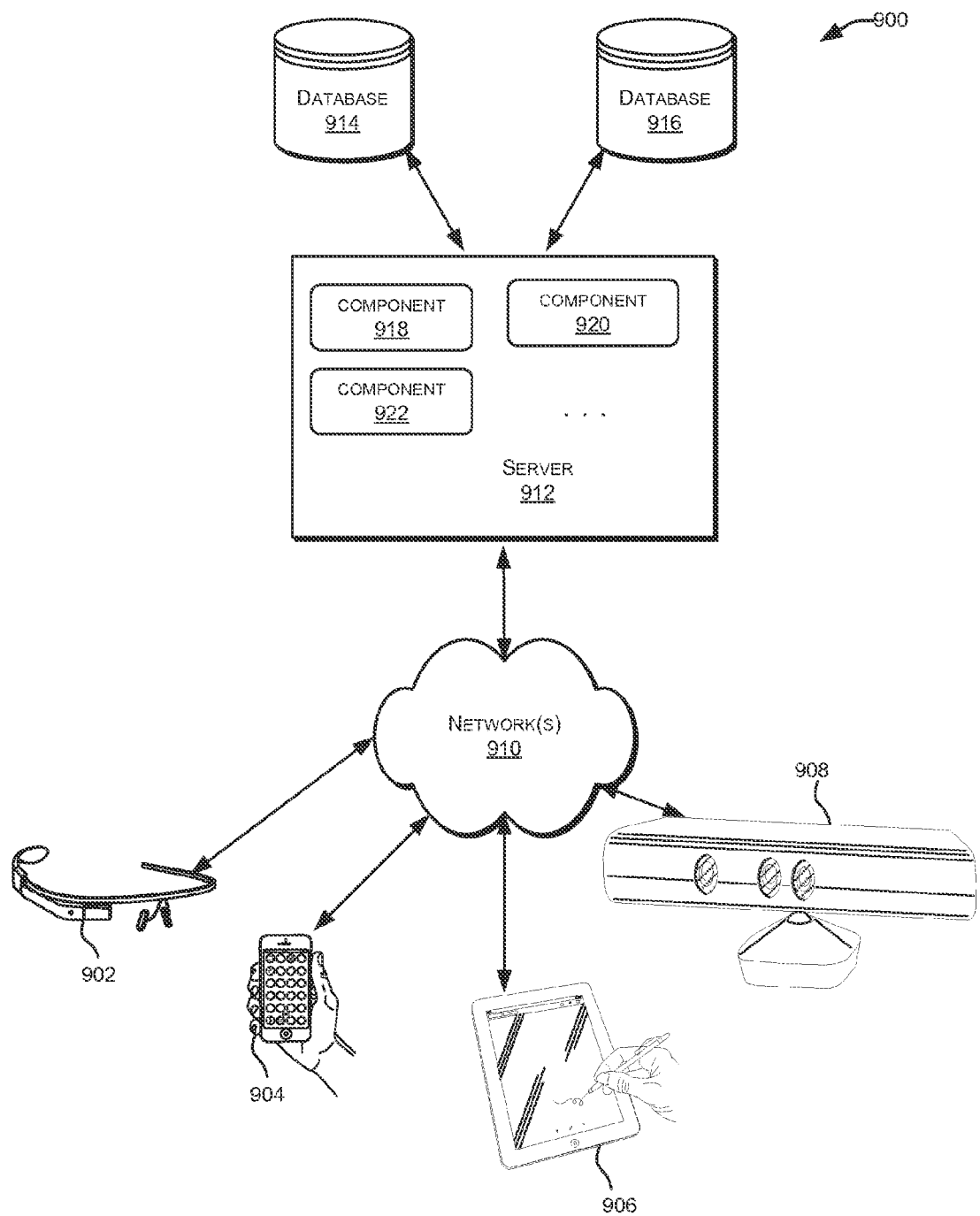
FIG. 9 depicts a simplified diagram of a distributed system for implementing one of the embodiments.

FIG. 9 depicts a simplified diagram of a distributed system 900 for implementing one of the embodiments. In the illustrated embodiment, distributed system 900 includes one or more client computing devices 902, 904, 906, and 908, which are configured to execute and operate a client application such as a web browser, proprietary client (e.g., Oracle Forms), or the like over one or more network(s) 910. Server 912 may be communicatively coupled with remote client computing devices 902, 904, 906, and 908 via network 910.

In various embodiments, server 912 may be adapted to run one or more services or software applications provided by one or more of the components of the system. In some embodiments, these services may be offered as web-based or cloud services or under a Software as a Service (SaaS) model to the users of client computing devices 902, 904, 906, and/or 908. Users operating client computing devices 902, 904, 906, and/or 908 may in turn utilize one or more client applications to interact with server 912 to utilize the services provided by these components.

In the configuration depicted in the figure, the software components 918, 920 and 922 of system 900 are shown as being implemented on server 912. In other embodiments, one or more of the components of system 900 and/or the services provided by these components may also be implemented by one or more of the client computing devices 902, 904, 906, and/or 908. Users operating the client computing devices may then utilize one or more client applications to use the services provided by these components. These components may be implemented in hardware, firmware, software, or combinations thereof. It should be appreciated that various different system configurations are possible, which may be different from distributed system 900. The embodiment shown in the figure is thus one example of a distributed system for implementing an embodiment system and is not intended to be limiting.

Client computing devices 902, 904, 906, and/or 908 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 902, 904, 906, and 908 may be any other electronic device, such as a thin-client computer, an Internet-enabled gaming system (e.g., a Microsoft Xbox gaming console with or without a Kinect® gesture input device), and/or a personal messaging device, capable of communicating over network(s) 910.

Although exemplary distributed system 900 is shown with four client computing devices, any number of client computing devices may be supported. Other devices, such as devices with sensors, etc., may interact with server 912.

Network(s) 910 in distributed system 900 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 910 can be a local area network (LAN), such as one based on Ethernet, Token-Ring and/or the like. Network(s) 910 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 912 may be adapted to run one or more services or software applications described in the foregoing disclosure. For example, server 912 may correspond to a server for performing processing described above according to an embodiment of the present disclosure.

Server 912 may run an operating system including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 912 may include one or more applications to analyze and consolidate data feeds and/or event updates received from users of client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 912 may also include one or more applications to display the data feeds and/or real-time events via one or more display devices of client computing devices 902, 904, 906, and 908.

Distributed system 900 may also include one or more databases 914 and 916. Databases 914 and 916 may reside in a variety of locations. By way of example, one or more of databases 914 and 916 may reside on a non-transitory storage medium local to (and/or resident in) server 912. Alternatively, databases 914 and 916 may be remote from server 912 and in communication with server 912 via a network-based or dedicated connection. In one set of embodiments, databases 914 and 916 may reside in a storage-area network (SAN). Similarly, any necessary files for performing the functions attributed to server 912 may be stored locally on server 912 and/or remotely, as appropriate. In one set of embodiments, databases 914 and 916 may include relational databases, such as databases provided by Oracle, which are adapted to store, update, and retrieve data in response to SQL-formatted commands.

Figure 10:
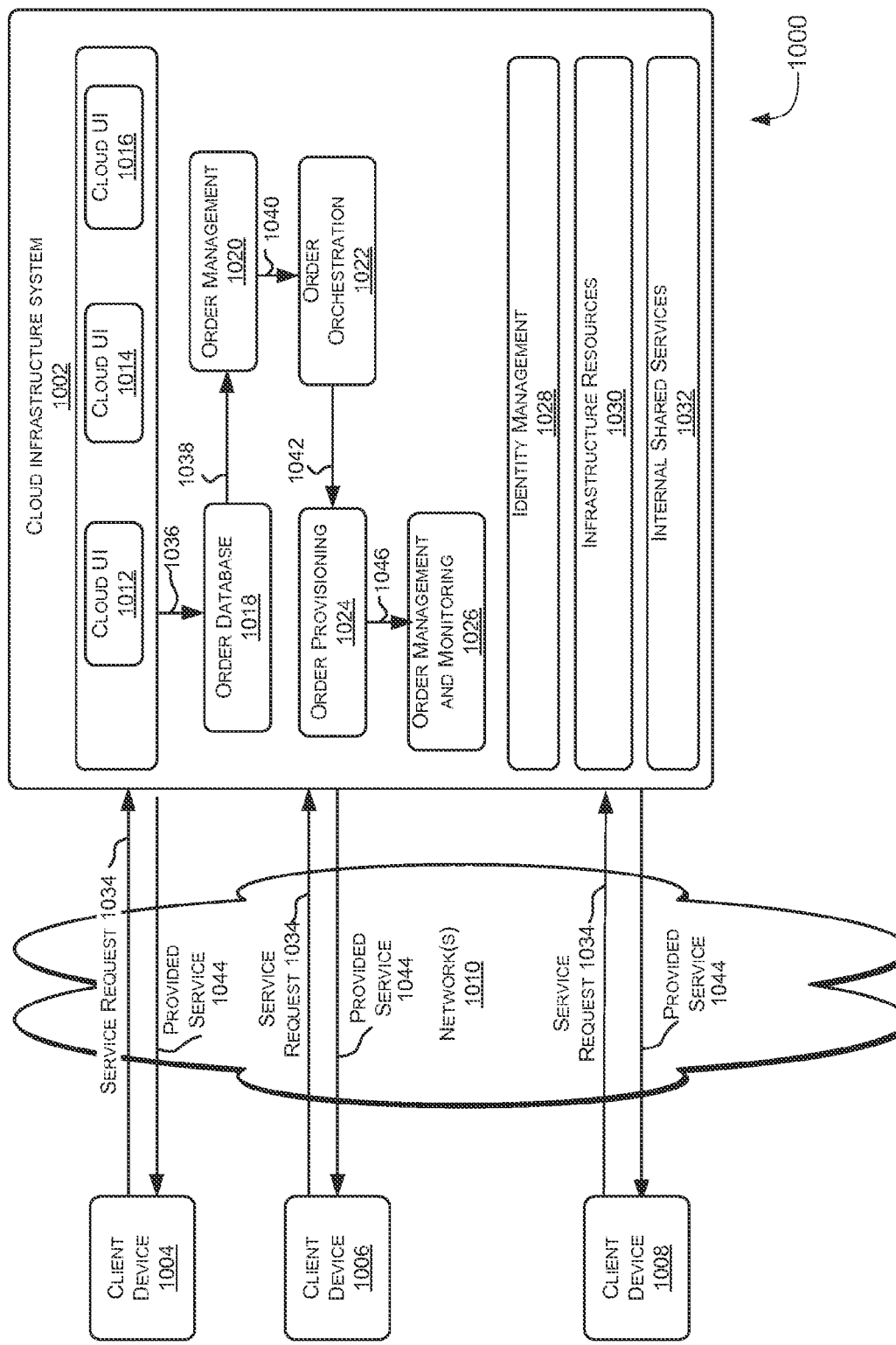
FIG. 10 is a simplified block diagram of components of a system environment by which services provided by the components of an embodiment system may be offered as cloud services, in accordance with an embodiment of the present disclosure.

FIG. 10 is a simplified block diagram of one or more components of a system environment 1000 by which services provided by one or more components of an embodiment system may be offered as cloud services, in accordance with an embodiment of the present disclosure. In the illustrated embodiment, system environment 1000 includes one or more client computing devices 1004, 1006, and 1008 that may be used by users to interact with a cloud infrastructure system 1002 that provides cloud services. The client computing devices may be configured to operate a client application such as a web browser, a proprietary client application (e.g., Oracle Forms), or some other application, which may be used by a user of the client computing device to interact with cloud infrastructure system 1002 to use services provided by cloud infrastructure system 1002.

It should be appreciated that cloud infrastructure system 1002 depicted in the figure may have other components than those depicted. Further, the embodiment shown in the figure is only one example of a cloud infrastructure system that may incorporate an embodiment of the invention. In some other embodiments, cloud infrastructure system 1002 may have more or fewer components than shown in the figure, may combine two or more components, or may have a different configuration or arrangement of components.

Client computing devices 1004, 1006, and 1008 may be devices similar to those described above for 902, 904, 906, and 908.

Although exemplary system environment 1000 is shown with three client computing devices, any number of client computing devices may be supported. Other devices such as devices with sensors, etc. may interact with cloud infrastructure system 1002.

Network(s) 1010 may facilitate communications and exchange of data between clients 1004, 1006, and 1008 and cloud infrastructure system 1002. Each network may be any type of network familiar to those skilled in the art that can support data communications using any of a variety of commercially-available protocols, including those described above for network(s) 910.

Cloud infrastructure system 1002 may comprise one or more computers and/or servers that may include those described above for server 912.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1002 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1002 may be adapted to automatically provision, manage and track a customer's subscription to services offered by cloud infrastructure system 1002. Cloud infrastructure system 1002 may provide the cloud services via different deployment models. For example, services may be provided under a public cloud model in which cloud infrastructure system 1002 is owned by an organization selling cloud services (e.g., owned by Oracle) and the services are made available to the general public or different industry enterprises. As another example, services may be provided under a private cloud model in which cloud infrastructure system 1002 is operated solely for a single organization and may provide services for one or more entities within the organization. The cloud services may also be provided under a community cloud model in which cloud infrastructure system 1002 and the services provided by cloud infrastructure system 1002 are shared by several organizations in a related community. The cloud services may also be provided under a hybrid cloud model, which is a combination of two or more different models.

In some embodiments, the services provided by cloud infrastructure system 1002 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1002. Cloud infrastructure system 1002 then performs processing to provide the services in the customer's subscription order.

In some embodiments, the services provided by cloud infrastructure system 1002 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1002 may also include infrastructure resources 1030 for providing the resources used to provide various services to customers of the cloud infrastructure system. In one embodiment, infrastructure resources 1030 may include pre-integrated and optimized combinations of hardware, such as servers, storage, and networking resources to execute the services provided by the PaaS platform and the SaaS platform.

In some embodiments, resources in cloud infrastructure system 1002 may be shared by multiple users and dynamically re-allocated per demand. Additionally, resources may be allocated to users in different time zones. For example, cloud infrastructure system 1030 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1032 may be provided that are shared by different components or modules of cloud infrastructure system 1002 and by the services provided by cloud infrastructure system 1002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1002 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1002, and the like.

In one embodiment, as depicted in the figure, cloud management functionality may be provided by one or more modules, such as an order management module 1020, an order orchestration module 1022, an order provisioning module 1024, an order management and monitoring module 1026, and an identity management module 1028. These modules may include or be provided using one or more computers and/or servers, which may be general purpose computers, specialized server computers, server farms, server clusters, or any other appropriate arrangement and/or combination.

In exemplary operation 1034, a customer using a client device, such as client device 1004, 1006 or 1008, may interact with cloud infrastructure system 1002 by requesting one or more services provided by cloud infrastructure system 1002 and placing an order for a subscription for one or more services offered by cloud infrastructure system 1002. In certain embodiments, the customer may access a cloud User Interface (UI), cloud UI 1012, cloud UI 1014 and/or cloud UI 1016 and place a subscription order via these UIs. The order information received by cloud infrastructure system 1002 in response to the customer placing an order may include information identifying the customer and one or more services offered by the cloud infrastructure system 1002 that the customer intends to subscribe to.

After an order has been placed by the customer, the order information is received via the cloud UIs, 1012, 1014 and/or 1016.

At operation 1036, the order is stored in order database 1018. Order database 1018 can be one of several databases operated by cloud infrastructure system 1018 and operated in conjunction with other system elements.

At operation 1038, the order information is forwarded to an order management module 1020. In some instances, order management module 1020 may be configured to perform billing and accounting functions related to the order, such as verifying the order, and upon verification, booking the order.

At operation 1040, information regarding the order is communicated to an order orchestration module 1022. Order orchestration module 1022 may utilize the order information to orchestrate the provisioning of services and resources for the order placed by the customer. In some instances, order orchestration module 1022 may orchestrate the provisioning of resources to support the subscribed services using the services of order provisioning module 1024.

In certain embodiments, order orchestration module 1022 enables the management of business processes associated with each order and applies business logic to determine whether an order should proceed to provisioning. At operation 1042, upon receiving an order for a new subscription, order orchestration module 1022 sends a request to order provisioning module 1024 to allocate resources and configure those resources needed to fulfill the subscription order. Order provisioning module 1024 enables the allocation of resources for the services ordered by the customer. Order provisioning module 1024 provides a level of abstraction between the cloud services provided by cloud infrastructure system 1000 and the physical implementation layer that is used to provision the resources for providing the requested services. Order orchestration module 1022 may thus be isolated from implementation details, such as whether or not services and resources are actually provisioned on the fly or pre-provisioned and only allocated/assigned upon request.

At operation 1044, once the services and resources are provisioned, a notification of the provided service may be sent to customers on client devices 1004, 1006 and/or 1008 by order provisioning module 1024 of cloud infrastructure system 1002.

At operation 1046, the customer's subscription order may be managed and tracked by an order management and monitoring module 1026. In some instances, order management and monitoring module 1026 may be configured to collect usage statistics for the services in the subscription order, such as the amount of storage used, the amount data transferred, the number of users, and the amount of system up time and system down time.

In certain embodiments, cloud infrastructure system 1000 may include an identity management module 1028. Identity management module 1028 may be configured to provide identity services, such as access management and authorization services in cloud infrastructure system 1000. In some embodiments, identity management module 1028 may control information about customers who wish to utilize the services provided by cloud infrastructure system 1002. Such information can include information that authenticates the identities of such customers and information that describes which actions those customers are authorized to perform relative to various system resources (e.g., files, directories, applications, communication ports, memory segments, etc.) Identity management module 1028 may also include the management of descriptive information about each customer and about how and by whom that descriptive information can be accessed and modified.

Figure 25:
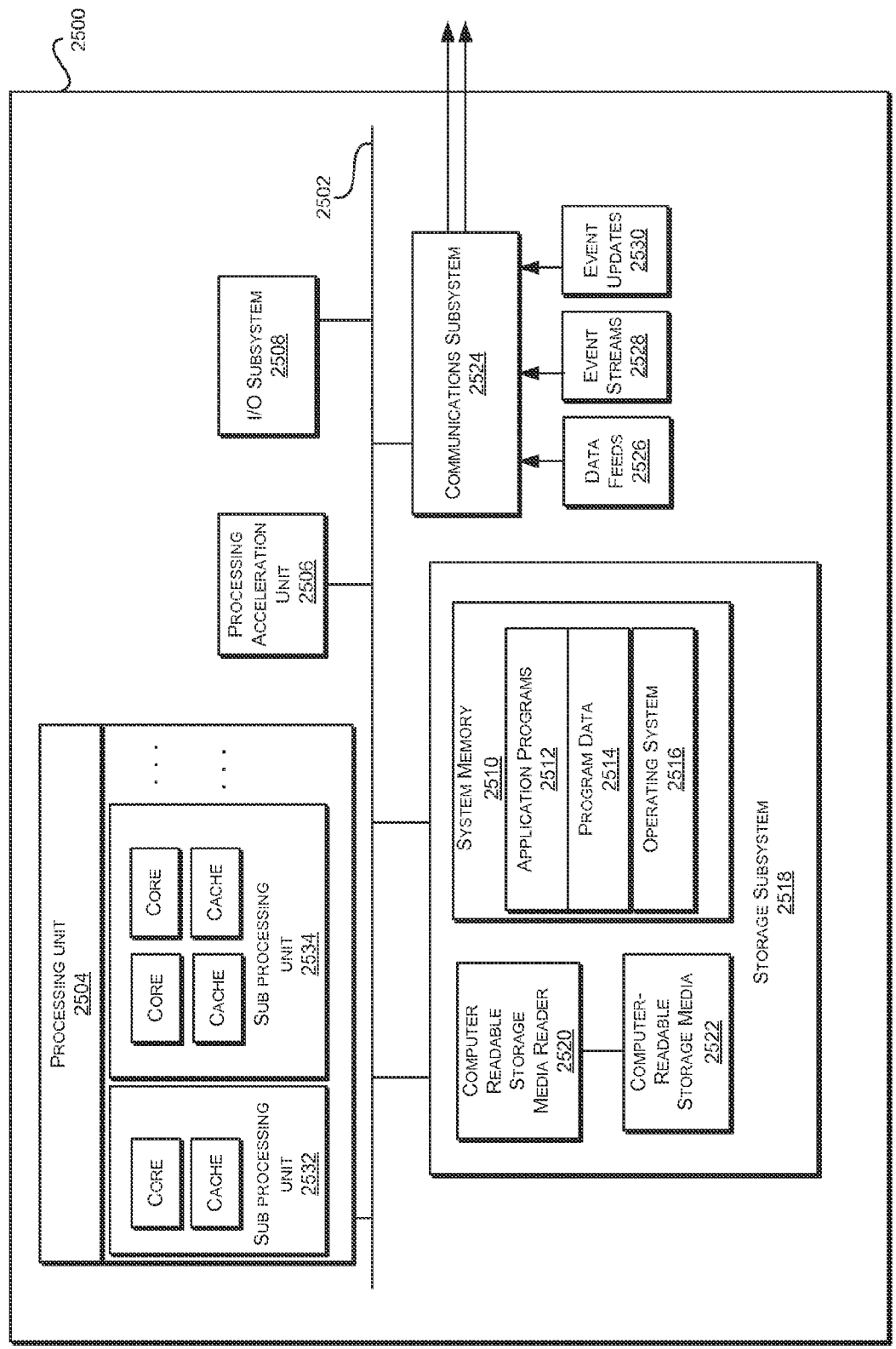
FIG. 25 illustrates an example of a computer system in which various embodiments of the present invention may be implemented.

FIG. 25 illustrates an example computer system 2500 in which various embodiments of the present invention may be implemented. The system 2500 may be used to implement any of the computer systems described above. As shown in the figure, computer system 2500 includes a processing unit 2504 that communicates with a number of peripheral subsystems via a bus subsystem 2502. These peripheral subsystems may include a processing acceleration unit 2506, an I/O subsystem 2508, a storage subsystem 2518 and a communications subsystem 2524. Storage subsystem 2518 includes tangible computer-readable storage media 2522 and a system memory 2510.

Bus subsystem 2502 provides a mechanism for letting the various components and subsystems of computer system 2500 communicate with each other as intended. Although bus subsystem 2502 is shown schematically as a single bus, alternative embodiments of the bus subsystem may utilize multiple buses. Bus subsystem 2502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2504, which can be implemented as one or more integrated circuits (e.g., a conventional microprocessor or microcontroller), controls the operation of computer system 2500. One or more processors may be included in processing unit 2504. These processors may include single core or multicore processors. In certain embodiments, processing unit 2504 may be implemented as one or more independent processing units 2532 and/or 2534 with single or multicore processors included in each processing unit. In other embodiments, processing unit 2504 may also be implemented as a quad-core processing unit formed by integrating two dual-core processors into a single chip.

In various embodiments, processing unit 2504 can execute a variety of programs in response to program code and can maintain multiple concurrently executing programs or processes. At any given time, some or all of the program code to be executed can be resident in processor(s) 2504 and/or in storage subsystem 2518. Through suitable programming, processor(s) 2504 can provide various functionalities described above. Computer system 2500 may additionally include a processing acceleration unit 2506, which can include a digital signal processor (DSP), a special-purpose processor, and/or the like.

I/O subsystem 2508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2500 may comprise a storage subsystem 2518 that comprises software elements, shown as being currently located within a system memory 2510. System memory 2510 may store program instructions that are loadable and executable on processing unit 2504, as well as data generated during the execution of these programs.

Depending on the configuration and type of computer system 2500, system memory 2510 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2504. In some implementations, system memory 2510 may include multiple different types of memory, such as static random access memory (SRAM) or dynamic random access memory (DRAM). In some implementations, a basic input/output system (BIOS), containing the basic routines that help to transfer information between elements within computer system 2500, such as during start-up, may typically be stored in the ROM. By way of example, and not limitation, system memory 2510 also illustrates application programs 2512, which may include client applications, Web browsers, mid-tier applications, relational database management systems (RDBMS), etc., program data 2514, and an operating system 2516. By way of example, operating system 2516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 25 OS, and Palm® OS operating systems.

Storage subsystem 2518 may also provide a tangible computer-readable storage medium for storing the basic programming and data constructs that provide the functionality of some embodiments. Software (programs, code modules, instructions) that when executed by a processor provide the functionality described above may be stored in storage subsystem 2518. These software modules or instructions may be executed by processing unit 2504. Storage subsystem 2518 may also provide a repository for storing data used in accordance with the present invention.

Storage subsystem 2500 may also include a computer-readable storage media reader 2520 that can further be connected to computer-readable storage media 2522. Together and, optionally, in combination with system memory 2510, computer-readable storage media 2522 may comprehensively represent remote, local, fixed, and/or removable storage devices plus storage media for temporarily and/or more permanently containing, storing, transmitting, and retrieving computer-readable information.

Computer-readable storage media 2522 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 2500.

By way of example, computer-readable storage media 2522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2522 may include, but is not limited to, Zip® drives, flash memory cards, universal serial bus (USB) flash drives, secure digital (SD) cards, DVD disks, digital video tape, and the like. Computer-readable storage media 2522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2500.

Communications subsystem 2524 provides an interface to other computer systems and networks. Communications subsystem 2524 serves as an interface for receiving data from and transmitting data to other systems from computer system 2500. For example, communications subsystem 2524 may enable computer system 2500 to connect to one or more devices via the Internet. In some embodiments communications subsystem 2524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2524 can provide wired network connectivity (e.g., Ethernet) in addition to or instead of a wireless interface.

In some embodiments, communications subsystem 2524 may also receive input communication in the form of structured and/or unstructured data feeds 2526, event streams 2528, event updates 2530, and the like on behalf of one or more users who may use computer system 2500.

By way of example, communications subsystem 2524 may be configured to receive data feeds 2526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2524 may also be configured to receive data in the form of continuous data streams, which may include event streams 2528 of real-time events and/or event updates 2530, which may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like. Communications subsystem 2524 may also be configured to output the structured and/or unstructured data feeds 2526, event streams 2528, event updates 2530, and the like to one or more databases that may be in communication with one or more streaming data source computers coupled to computer system 2500.

Computer system 2500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2500 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
    identifying, from a database, a set of statuses in a workflow;
    rendering, on a display, a graphical user interface (GUI) including a first region and a flow region, wherein the first region shows a graphical element for each status in the set of statuses;
    in response to a first user input, moving a first graphical element representing a first status from the first region to the flow region;
    in response to a second user input, moving a second graphical element representing a second status from the first region to the flow region;
    determining, from the database, a first set of objects possessing the first status at a first point in time;
    updating the GUI to include a first visual aspect of the first graphical element, the first visual aspect indicating a first quantity of objects in the first set of objects possessing the first status at the first point in time;
    in response to a third user input specifying a second point in time that is after the first point in time:
        determining, from the first set of objects, a second set of objects possessing the second status at the second point in time;
        determining, from the first set of objects, a third set of objects possessing the first status at the second point in time;
        adjusting the first graphical element such that the first visual aspect of the first graphical element indicates a third quantity of objects in the third set of objects possessing the first status at the second point in time; and
        updating the GUI to include a second visual aspect that indicates a second quantity of objects in the second set of objects possessing the second status at the second point in time; and
    in response to a fourth user input linking the first graphical element and the second graphical element together in the flow region:
        updating the GUI to include a third graphical element with a third visual aspect that indicates a movement of objects that have a change in status from the first set of objects at the first point in time indicated by the first graphical element to the second set of objects at the second point in time indicated by the second graphical element;
        wherein the adjusted first graphical element, the second graphical element, and the third graphical element are displayed concurrently in the flow region.

2. The method of claim 1, wherein the first visual aspect of the first graphical element includes a size of the first graphical element, the size corresponding to a quantity of objects possessing the first status.

3. The method of claim 1, further comprising:
    automatically generating snapshots of the database respectively at the first point in time and at the second point in time;
    automatically storing the snapshots of the database within a data warehouse that is separate from the database;
    querying a first snapshot of the snapshots of the database to obtain the first set of objects, wherein the first snapshot is associated with the first point in time;

querying a second snapshot of the snapshots of the database to obtain a fourth set of objects, wherein the second snapshot is associated with the second point in time; and obtaining the third set of objects from the first set of objects and the fourth set of objects based on one or more object identifiers common between the first set of objects and the fourth set of objects.

4. A computer-implemented method comprising:

rendering, on a display device, a graphical user interface (GUI) including a flow region showing a plurality of graphical elements, each graphical element representing a status of a workflow;

in response to a first user input linking a first graphical element representing a first status and a second graphical element representing a second status together in the flow region, updating the GUI to include a diagram indicating movement from the first graphical element to the second graphical element;

determining, from a database, a first set of objects associated with the first status at a first time point;

determining, from the database, a second set of objects associated with the second status at the first time point;

displaying, on the display device, the diagram showing the first graphical element, such that a size of the first graphical element is based on a first quantity of the first set of objects;

displaying, on the display device and together on the diagram with the first graphical element, the second graphical element such that a size of the second graphical element is based on a second quantity of the second set of objects;

in response to receiving a second user input specifying a second time point that is after the first time point:
 determining, from the first set of objects, a third set of objects associated with the second status at the second time point;
 determining, from the first set of objects, a fourth set of objects associated with the first status at the second time point;
 determining, from the second set of objects, a fifth set of objects associated with the first status at the second time point;
 determining, from the second set of objects, a sixth set of objects associated with the second status at the second time point;
 updating the size of the displayed first graphical element to reflect a first total quantity of the fourth set of objects and the fifth set of objects at the second time point; and
 updating the size of the displayed second graphical element to reflect a second total quantity of the third set of objects and the sixth set of objects at the second time point.

5. The computer-implemented method of claim 4, further comprising:

receiving the second user input from a timeline displayed in the GUI; and based on the receiving the second user input, (1) determining the first total quantity of the fourth set of objects and the fifth set of objects associated with the first status at the second time point and (2) determining the second total quantity of the third set of objects and the sixth set of objects associated with the second status at the second time point.

6. The computer-implemented method of claim 5, wherein (1) determining the first total quantity of the fourth set of objects and the fifth set of objects associated with the first status at the second time point or (2) determining the second total quantity of the third set of objects and the sixth set of objects associated with the second status at the second time point comprises:

querying at least one database snapshot of a plurality of database snapshots, the at least one database snapshot containing data that corresponds to the second time point;

wherein each database snapshot of the plurality of database snapshots was generated as a part of an operation that periodically creates a backup of a transactional database.

7. The computer-implemented method of claim 6, wherein querying the at least one database snapshot comprises selecting, from multiple columns of tabular data stored within the at least one database snapshot, only data contained within one or more columns that were automatically determined, without human intervention, and based on specified criteria, that represent object status.

8. The computer-implemented method of claim 4, further comprising:

receiving, from a first user, a third user input that associates first user-selected text with a third time point;

storing the first user-selected text in association with the third time point;

showing the first user-selected text during display of a graphical element reflecting a quantity of objects associated with the third time point; and hiding the first user-selected text during display of a graphical element reflecting a quantity of objects that are not associated with the third time point.

9. The computer-implemented method of claim 8, wherein receiving the third user input that associates the first user-selected text with the third time point comprises receiving the third user input during display of the graphical element reflecting the quantity of objects associated with the third time point, wherein storing of the first user-selected text in association with the third time point is performed in response to the third user input being received during the display of the graphical element reflecting the quantity of objects associated with the third time point.

10. The computer-implemented method of claim 8, further comprising:

receiving, from a second user separate from the first user, through a computing device other than a computing device through which the first user-selected text was received, a fourth user input that associates second user-selected text with a fourth time point that differs from the third time point;

storing the second user-selected text in association with the fourth time point;

showing the second user-selected text during display of a graphical element reflecting a quantity of objects associated with the fourth time point; and hiding the second user-selected text during display of a graphical element reflecting a quantity of objects that are not associated with the fourth time point.

11. A non-transitory computer-readable storage medium storing instructions which, when executed by one or more processors, cause the one or more processors to perform operations comprising:

rendering, on a display device, a graphical user interface (GUI) including a flow region showing a plurality of graphical elements, each graphical element representing a status of a workflow;

in response to a first user input linking a first graphical element representing a first status and a second graphical element representing a second status together in the flow region, updating the GUI to include a diagram indicating movement from the first graphical element to the second graphical element;

determining, from a database a first set of objects associated with the first status at a first time point;

determining, from the database, a second set of objects associated with the second status at the first time point;

displaying, on the display device, the diagram showing the first graphical element such that a size of the first graphical element is based on a first quantity of the first set of objects;

displaying, on the display device and together on the diagram with the first graphical element, the second graphical element such that a size of the second graphical element is based on a second quantity of the second set of objects;

in response to receiving a second user input specifying a second time point that is after the first time point:

determining, from the first set of objects, a third set of objects associated with the second status at the second time point;

determining, from the first set of objects, a fourth set of objects associated with the first status at the second time point;

determining, from the second set of objects, a fifth set of objects associated with the first status at the second time point;

determining, from the second set of objects, a sixth set of objects associated with the second status at the second time point;

updating the size of the displayed first graphical element to reflect a first total quantity of the fourth set of objects and the fifth set of objects at the second time point; and updating the size of the displayed second graphical element to reflect a second total quantity of the third set of objects and the sixth set of objects.

12. The non-transitory computer-readable storage medium of claim 11, the operations further comprising:

receiving the second user input from a timeline displayed in the GUI; and based on receiving the second user input, (1) determining the first total quantity of the fourth set of objects and the fifth set of objects associated with the first status at the second time point and (2) determining the second total quantity of the third set of objects and the sixth set of objects associated with the second status at the second time point.

13. The non-transitory computer-readable storage medium of claim 12, wherein: (1) determining the first total quantity of the fourth set of objects and the fifth set of objects associated with the first status at the second time point or (2) determining the second total quantity of the third set of objects and the sixth set of objects associated with the second status at the second time point comprises:

querying at least one database snapshot of a plurality of database snapshots, the at least one database snapshot containing data that corresponds to the second time point.

14. The non-transitory computer-readable storage medium of claim 13, wherein each database snapshot of the plurality of database snapshots was generated as a part of an operation that periodically creates a backup of a transactional database.

15. The non-transitory computer-readable storage medium of claim 13, wherein querying the at least one database snapshot comprises selecting, from multiple columns of tabular data stored within the at least one database snapshot, only data contained within one or more columns that were automatically determined, without human intervention, and based on specified criteria, that represent object status.

16. The non-transitory computer-readable storage medium of claim 15, the operations further comprising:

receiving, from a first user, a third user input that associates first user-selected text with a third time point;

storing the first user-selected text in association with the third time point;

showing the first user-selected text during display of a graphical element reflecting a quantity of objects associated with the third time point; and hiding the first user-selected text during display of a graphical element reflecting a quantity of objects that are not associated with the third time point.

17. The non-transitory computer-readable storage medium of claim 16, wherein receiving the third user input that associates the first user-selected text with the third time point comprises receiving the third user input during display of the graphical element reflecting the quantity of objects associated with the third time point, wherein storing of the first user-selected text in association with the third time point is performed in response to the first user input being received during the display of the graphical element reflecting the quantity of objects associated with the third time point.

18. The non-transitory computer-readable storage medium of claim 16, said operations further comprising:

receiving, from a second user separate from the first user, through a computing device other than a computing device through which the first user-selected text was received, a fourth user input that associates second user-selected text with a fourth time point that differs from the third time point;

storing the second user-selected text in association with the fourth time point;

showing the second user-selected text during display of a graphical element reflecting a quantity of objects associated with the fourth time point; and hiding the second user-selected text during display of a graphical element reflecting a quantity of objects that are not associated with the fourth time point.

19. The method of claim 1, wherein the adjusted first graphical element is rendered adjacent to the second graphical element; and wherein the third graphical element is rendered as a connection element connecting the adjusted first graphical element with the second graphical element.

20. The method of claim 1, wherein the first graphical element includes a first bar chart that shows a history of a quantity of objects possessing the first status with respect to time; and wherein the second graphical element includes a second bar chart that shows a history of a quantity of objects possessing the second status with respect to time.

* * * * *

UNITED STATES PATENT AND TRADEMARK OFFICE
CERTIFICATE OF CORRECTION

PATENT NO. : 10,001,908 B2
APPLICATION NO. : 14/174835
DATED : June 19, 2018
INVENTOR(S) : Grieve et al.

Page 1 of 1

It is certified that error appears in the above-identified patent and that said Letters Patent is hereby corrected as shown below:

In the Specification

In Column 19, Line 13, delete "that that" and insert -- that --, therefor.

Signed and Sealed this
Eighteenth Day of June, 2019

Andrei Iancu
*Director of the United States Patent and Trademark Office*